(12) United States Patent
Watanabe et al.

(10) Patent No.: US 7,645,514 B2
(45) Date of Patent: Jan. 12, 2010

(54) CURING RESIN COMPOSITION, ADHESIVE EPOXY RESIN PASTE, ADHESIVE EPOXY RESIN SHEET, CONDUCTIVE CONNECTION PASTE, CONDUCTIVE CONNECTION SHEET, AND ELECTRONIC COMPONENT JOINED BODY

(75) Inventors: Koji Watanabe, Mishima-gun (JP); Toshio Enami, Osaka (JP); Yoshiyuki Takebe, Amagasaki (JP); Tatsuo Suzuki, Koka-gun (JP)

(73) Assignee: Sekisui Chemical Co., Ltd., Osaka-shi (JP)

( * ) Notice: Subject to any disclaimer, the term of this patent is extended or adjusted under 35 U.S.C. 154(b) by 340 days.

(21) Appl. No.: 10/541,586

(22) PCT Filed: Dec. 26, 2003

(86) PCT No.: PCT/JP03/16906
§ 371 (c)(1),
(2), (4) Date: Sep. 30, 2005

(87) PCT Pub. No.: WO2004/060996
PCT Pub. Date: Jul. 22, 2004

(65) Prior Publication Data
US 2006/0154078 A1 Jul. 13, 2006

(30) Foreign Application Priority Data

| | | | |
|---|---|---|---|
| Jan. 7, 2003 | (JP) | | 2003-001276 |
| Mar. 25, 2003 | (JP) | | 2003-083588 |
| Jun. 20, 2003 | (JP) | | 2003-177221 |
| Jun. 20, 2003 | (JP) | | 2003-177222 |
| Sep. 29, 2003 | (JP) | | 2003-338284 |
| Dec. 2, 2003 | (JP) | | 2003-403703 |

(51) Int. Cl.
*B32B 27/38* (2006.01)
*C09J 163/00* (2006.01)
*C08L 63/00* (2006.01)

(52) U.S. Cl. ......... 428/416; 156/330; 428/413; 428/414; 428/415; 428/417; 428/418; 525/523; 525/524; 525/529; 525/530; 525/533

(58) Field of Classification Search .......... None
See application file for complete search history.

(56) References Cited

U.S. PATENT DOCUMENTS

| | | | |
|---|---|---|---|
| 4,940,740 A | 7/1990 | Folda et al. | |
| 5,686,509 A | 11/1997 | Nakayama et al. | |
| 5,940,603 A | 8/1999 | Huang | |
| 6,223,429 B1 * | 5/2001 | Kaneda et al. | 29/832 |
| 6,309,502 B1 * | 10/2001 | Hiroshige et al. | 156/273.3 |
| 6,328,844 B1 | 12/2001 | Watanabe et al. | |
| 6,673,441 B1 * | 1/2004 | Tanaka et al. | 428/355 EP |
| 7,070,670 B2 * | 7/2006 | Tomiyama et al. | 156/248 |
| 2002/0009597 A1 * | 1/2002 | Shinozaki et al. | 428/413 |
| 2002/0025431 A1 | 2/2002 | Sawamura et al. | |
| 2003/0029559 A1 | 2/2003 | Yamada et al. | |

FOREIGN PATENT DOCUMENTS

| | | |
|---|---|---|
| EP | 0 914 027 A1 | 5/1999 |
| EP | 1 160 857 A2 | 12/2001 |
| GB | 2 280 524 A | 2/1995 |
| JP | 59-230068 A1 | 12/1984 |
| JP | 03-205445 | 9/1991 |
| JP | 4-332722 A1 | 11/1992 |
| JP | 7-73066 | 3/1995 |
| JP | 2000-248052 A1 | 9/2000 |
| JP | 3114162 | 9/2000 |
| JP | 2002-60467 A1 | 2/2002 |
| JP | 2002-241584 A1 | 8/2002 |
| JP | 3342703 | 8/2002 |
| JP | 2002-313143 | 10/2002 |
| TW | 487935 | 5/2002 |
| TW | 495536 | 7/2002 |
| TW | 505673 | 10/2002 |
| WO | WO 00/78887 | * 12/2000 |
| WO | WO 01/74962 | * 10/2001 |

OTHER PUBLICATIONS

Machine Translation of JP 2002-241584, provided by the JPO website (2002).*
Machine Translation of JP 2000-248052, provided by the JPO website (2000).*
Technical Data Sheet for EPON Resin 164, provided by Hexion Specialty Chemicals (No Date).*

* cited by examiner

*Primary Examiner*—Michael J Feely
(74) *Attorney, Agent, or Firm*—Connolly Bove Lodge & Hutz LLP

(57) ABSTRACT

It is an object of the invention to provide a curable resin composition excellent in mechanical strength, heat resistance, moisture resistance, flexibility, resistance to thermal cycles, resistance to solder reflow, dimensional stability, and the like after curing and providing high adhesion reliability and conduction reliability and an adhesive epoxy resin paste, an adhesive epoxy resin sheet, a conductive connection paste, and a conductive connection sheet using the curable resin composition, and an electronic component joined body. The invention relates to a curable resin composition, which contains an epoxy resin, a solid polymer having a functional group to react with the epoxy group and a curing agent for an epoxy resin, no phase separation structure being observed in a matrix of a resin when a cured product is dyed with a heavy metal and observed with a transmission electron microscope.

28 Claims, No Drawings

CURING RESIN COMPOSITION, ADHESIVE EPOXY RESIN PASTE, ADHESIVE EPOXY RESIN SHEET, CONDUCTIVE CONNECTION PASTE, CONDUCTIVE CONNECTION SHEET, AND ELECTRONIC COMPONENT JOINED BODY

This is a national stage entry of PCT/JP03/16906, filed Dec. 26, 2003 and published as WO 04/060996, which claims foreign priority to: JP 2003-403703, filed Dec. 2, 2003; JP 2003-338284, filed Sep. 29, 2003; JP 2003-177222, filed Jun. 20, 2003; JP 2003-177221, filed Jun. 20, 2003; JP 2003-083588, filed Mar. 25, 2003; and JP 2003-001276, filed Jan. 7, 2003.

TECHNICAL FIELD

The invention relates to a curable resin composition, an adhesive epoxy resin paste, an adhesive epoxy resin sheet, a conductive connection paste, a conductive connection sheet, and an electronic component joined body, which have high reliability. Additionally, the sheet of the invention includes a film.

BACKGROUND ART

Along with requirements to semiconductor devices to be compact and have high performance in recent years, various adhesives for electronic materials have been developed. These adhesives for electronic materials are required to be highly reliable and to secure it, epoxy resins scarcely shrinking by curing, having high adhesive capability, made various in types, and easy for planning for blending have most popularly been used. As such epoxy resins, for example, common liquid-state epoxy resins such as bisphenol A type liquid-state epoxy resins and bisphenol F type liquid-state epoxy resin have been generally often used because of excellent workability. However, adhesives for electronic materials containing such liquid-state epoxy resins for common use tend to be unsatisfactory to the requirements for rather high reliability of the present time and innovative and highly capable epoxy resins have been developed. The adhesives of the invention include pressure sensitive adhesives.

Practical properties presently required for the adhesives for electronic materials to have reliability are, for example, heat resistance, moisture resistance, resistance to thermal cycles, resistance to solder reflow, and the like and among them, with respect to the moisture resistance and resistance to solder reflow, it is required that cured adhesives indispensably have a low water absorption coefficient and low water absorption amount. This is because if the water absorption coefficient of a cured adhesive is high, water easily penetrates the adhesion interface and may possibly lowers the adhesive force in the interface. Also, if the water absorption amount of the cured adhesive is high, the water steeply evaporated at a solder reflow temperature, which may be as high as 200 to 260° C. to possibly break electronic parts.

On the other hand, in order to improve the resistance to thermal cycles, a large quantity of an inorganic filler is added generally to lower a linear expansion coefficient (linear expansion ratio). It is attributed to that the inorganic filler has a linear expansion coefficient much smaller than that of an organic filler. However, if a large quantity of the inorganic filler is added, although the linear expansion coefficient becomes low, the elastic modulus of an adhesive is increased and therefore, it leads to a problem that the cured adhesive becomes hard to relax the stress. That is, a method of improving the resistance to thermal cycles by adding the inorganic filler has limitations. Also, there is a problem that in the case of using the adhesive in form of an adhesive sheet obtained by processing the adhesive in sheet-like shape, the inorganic filler added thereto lowers the strength of the adhesive sheet before curing or makes processing by laser difficult at the time of using the adhesive sheet for a substrate required to have via holes or makes formation of via holes with a high precision difficult.

With respect to the improvement of resistance to thermal cycles, it is generally carried out to add a rubber polymer such as acrylic rubber in order to lower the stress to be generated (e.g. reference to Japanese Patent Publication No. 3,342,703)

However if the rubber polymer is added, although the resistance to thermal cycles is improved, the stress is relaxed by sacrificing the heat resistance and therefore, it is very difficult to satisfy high heat resistance and moisture resistance as well as the resistance to thermal cycles simultaneously. That is, to achieve the resistance to thermal cycles in advanced level, it is required to relax the stress to be generated at the time of thermal cycles.

To cause the effect to relax the stress, there is a method of adding a component for providing flexibility such as carboxylic acids; glycidyl-modified polyolefins; diene type rubber polymers having functional groups such as CTBN, ATBN, or the like; nitrile rubber; silicones having reactive groups in the terminals; acrylic rubber; or styrene type elastomers is added in a compatible or phase-separation manner. However, in the case where these flexibility-providing components are compatible with the epoxy resin to be a matrix resin, the heat resistance is considerably decreased and it becomes impossible to exhibit a high heat resistant adhesive capability at high temperature. Further, even in the case of these flexibility-providing components are in the phase-separation structure, the flexibility-providing components and the epoxy resin slightly become mutually compatible in their interface to result in tendency of heat resistance decrease. The phase-separation structure is not necessarily stable to temperature alteration and therefore, it may be possible to be compatible state depending on the temperature alteration.

Conventionally, an epoxy resin type curable composition often contains an acid anhydride and the like as a curing agent and in such a case, an un-reacted product remains in the cured product after curing in some cases. There is a problem that the un-reacted product become acidic or alkaline by reaction caused by moisture absorption and for that, an acidic substance or an alkaline substance flows out to the cured product surface and the periphery thereof and causes an adverse problem such as corrosion of an electrode metal such as aluminum and copper. Further, there is a problem that chlorine depletion reaction is caused using the acid formed by hydrolysis in the cured product as a catalyst to result in flowing out of chlorine ion and adverse deterioration of reliability.

On the other hand, in fabrication process of electronic products such as liquid crystal displays, personal computers, and mobile communication appliances, in the case of electrically connecting a small part such as a semiconductor device to a substrate, it is required to carry out the connection while setting fine electrodes on the opposite to each other. Further, in fabrication process of circuit in glass substrates surface, in the case where a conductive circuit is formed in the glass surface such as a lighting part of an automobile, it is required to carry out the connection while setting the glass surface and the electrode face of the conductive circuit on the opposite to each other.

As a method of connecting these electrodes, methods of connecting bumps using a solder or a conductive connection paste or directly pressure-bonding the bumps on the opposite to each other have generally been employed. Also, to protect the electrodes after the connection, methods of sealing the electrodes with resins after connection have been employed.

However, since the connection distance of fine electrodes is short, it is difficult to seal the electrodes by evenly filling the resins to the gap within a short time. Also, in the case where the glass surface and the electrode face of the conductive circuit are connected to each other, there is a problem that the connection part is heated too high if connection is carried out by soldering.

In order to solve such problems, it has been investigated to use anisotropic conductive adhesives formed to be sheet-like or paste-like adhesives by mixing conductive fine particles and insulating adhesives (e.g. reference to Japanese Patent Publication No. 3,114,162 and Japanese Kokoku Publication Hei-7-73066).

However, the conventional sheet-like anisotropic conductive adhesives have a problem that in the case where the conductive fine particles are pushed to an electrode or a bump by thermal pressure-bonding to seal the electrode, the insulating adhesives remain between the electrode and conductive fine particles to lower the connection reliability.

In the case of paste-like anisotropic conductive adhesives, the adhesives are required to have good coatability such as a high coating precision and coating efficiency at the time of applying the pastes, however there is a problem that the conventional paste-like anisotropic conductive adhesives containing a large quantity of inorganic fillers are not necessarily sufficient in fluidity and therefore not satisfactory in the coatability. In the case of producing anisotropic conductive adhesive sheets by cast method, the adhesives are also required to have good coatability. Further, there is a problem that the conductive fine particles are not evenly dispersed in the insulating adhesives, so that the conductive fine particles are agglomerated and cause short circuit of neighboring electrodes.

Therefore, inventors of the invention have previously developed a conductive connection sheet containing conductive fine particles held on an adhesive resin sheet at the time of handling the sheet and a part of the conductive fine particles are exposed out of the conductive resin sheet. The conductive connection sheet gives a high connective reliability since no insulating adhesive remains between an electrode and the conductive fine particles and the fine particles are not agglomerated (e.g. reference to Japanese Kokai Publication 2002-313143).

However, the inventors of the invention have found that the conductive connection sheet is difficult to keep both the conductive fine particles and the sheet-like shape in the case where the conductive connection sheet is used in, for example, a connection part of an electronic product or a lighting part of an automobile and is exposed in high temperature and high humidity environments, which are typically represented by a pressure cooker test (PCT), during the use.

Practically, with respect to the conductive connection sheet, there arises a problem that if the adhesive property of the sheet to the conductive fine particles is increased to improve the capability of the sheet for holding the conductive fine particles at normal temperature before curing, the sheet is softened and deteriorated in the shape-retaining capability to lower the connection reliability in high temperature and high humidity environments even after curing. On the other hand, there arises a problem that if the shape-retaining capability of the sheet in high temperature and high humidity environments is increased so as not to soften the sheet even in the high temperature and high humidity environments, the adhesive property of the sheet to the conductive fine particles at normal temperature is deteriorated to result in a problem of decrease of the capability of the sheet for holding the conductive fine particles.

The epoxy resin type curable composition may be used also as an insulating substrate material, and an insulating substrate to be used for a multilayer printed substrate and the like is required to scarcely cause effects on electric properties, to have low moisture absorbability, and to be transparent so as to make laser positioning easy and is further strongly required to have little size alteration at the time of high temperature treatment, for example, at the time of solder reflow.

The epoxy resin type curable composition may be used also as an insulating substrate material, and an insulating substrate to be used for a multilayer printed substrate and the like is required to scarcely cause effects on electric properties, to have low moisture absorbability, and to be transparent so as to make positioning of respective sheets by an optical system lens easy and is further strongly required to have little size alteration at the time of high temperature treatment, for example, at the time of solder reflow.

The properties and capabilities similar to those described above are required for die attach film insulating materials for bonding silicon chips to metal frames, multilayer boards, organic substrates such as build-up substrates, and ceramic substrates. Further, as silicon chips bearing die attach films, those to which a film is attached when they are assembled in a wafer form and those to which films are respectively attached are made available and the silicon chips, in which both cases are similarly required to have the same properties and capabilities.

SUMMARY OF THE INVENTION

In view of the state of the art, the invention aims to provide a curable resin composition excellent in mechanical strength, heat resistance, moisture resistance, flexibility, resistance to thermal cycles, resistance to solder reflow, dimensional stability, and the like after curing and providing high adhesion reliability and conduction reliability in the case of use as a conductive material and an adhesive epoxy resin paste, an adhesive epoxy resin sheet, a conductive connection paste, and a conductive connection sheet using the curable resin composition, and an electronic component joined body using these substances.

A curable resin composition of the invention according to claim 1 (hereinafter referred to the first invention) contains an epoxy resin, a solid polymer having a functional group to react with an epoxy group and a curing agent for an epoxy resin, no phase separation structure being observed in a matrix of a resin when a cured product is dyed with a heavy metal and observed with a transmission electron microscope.

A curable resin composition of the invention according to claim 2 is the curable resin composition according to claim 1, wherein the cured product has a single tan δ peak in viscoelasticity spectrometry and the temperature of the peak is 120° C. or higher.

A curable resin composition of the invention according to claim 3 is the curable resin composition according to claim 1 or 2, wherein the cured product has a swelling ratio of 50% or less measured in a dimethyl sulfoxide solution heated at 120° C.

A curable resin composition of the invention according to claim 4 is the curable resin composition according to claim 1, 2 or 3, wherein extracted water obtained by extracting an eluting component of the cured product with hot water at 110° C. has pH not lower than 5.0 and lower than 8.5.

A curable resin composition of the invention according to claim 5 is the curable resin composition of according to claim 1, 2, 3 or 4, wherein extracted water obtained by extracting an eluting component of the cured product with hot water at 110° C. has an electric conductivity of 100 μS/cm or lower.

A curable resin composition of the invention according to claim 6 is the curable resin composition according to claim 1, 2, 3, 4 or 5, wherein the cured product has a dielectric constant of 3.5 or lower and a dielectric loss tangent of 0.02 or lower.

A curable resin composition of the invention according to claim 7 is the curable resin composition according to claim 1, 2, 3, 4, 5 or 6, wherein the epoxy resin is an epoxy resin having a polycyclic hydrocarbon skeleton in the main chain and the solid polymer having the functional group to react with the epoxy group is a high molecular polymer having an epoxy group and no inorganic filler is contained.

A curable resin composition of the invention according to claim 8 is the curable resin composition according to claim 7, wherein the epoxy resin having a polycyclic hydrocarbon skeleton in the main chain is an epoxy resin having a dicyclopentadiene skeleton or an epoxy resin having a naphthalene skeleton.

A curable resin composition of the invention according to claim 9 is the curable resin composition according to 7 or 8, wherein the high molecular polymer having an epoxy group has a weight-average molecular weight (Mw) of 10,000 or higher.

A curable resin composition of the invention according to claim 10 is the curable resin composition according to claim 7, 8 or 9, wherein the high molecular polymer having an epoxy group has an epoxy equivalent of 200 to 1,000.

A curable resin composition of the invention according to claim 11 is the curable resin composition according to claim 7, 8, 9 or 10, wherein the high molecular polymer having an epoxy group is produced by suspension polymerization method.

A curable resin composition of the invention according to claim 12 is the curable resin composition according to claim 1, 2, 3, 4, 5, 6, 7, 8, 9, 10 or 11, which further contains a low elastic modulus substance having elastic modulus (G') in a range of $1 \times 10^5$ to $1 \times 10^8$ Pa at 20° C., the low elastic modulus substance being dispersed like an island in non-compatible state with the epoxy resin and the solid polymer having the functional group to react with the epoxy group.

A curable resin composition of the invention according to claim 13 (hereinafter referred to the second invention) contains an epoxy resin composition obtained by mixing an epoxy resin having a dicyclopentadiene skeleton, an epoxy resin having a naphthalene skeleton and a curing agent for an epoxy resin, and rubber particles having a core-shell structure, the core having a glass transition temperature of 20° C. or lower and the shell having a glass transition temperature of 40° C. or higher.

An adhesive epoxy resin paste of the invention according to claim 14 (hereinafter referred to the third invention) comprises the curable resin composition according to claim 1, 2, 3, 4, 5, 6, 7, 8, 9, 10, 11, 12 or 13.

An interlayer adhesive of the invention according to claim 15 (hereinafter referred to the fourth invention) comprises the adhesive epoxy resin paste according to claim 14.

A non-conductive paste of the invention according to claim 16 (hereinafter referred to the fifth invention) comprises the adhesive epoxy resin paste according to claim 14.

An underfill of the invention according to claim 17 (hereinafter referred to the sixth invention) comprises the adhesive epoxy resin paste according to claim 14.

An adhesive epoxy resin sheet of the invention according to claim 18 (hereinafter referred to the seventh invention) is obtainable by forming the curable resin composition according to claim 1, 2, 3, 4, 5, 6, 7, 8, 9, 10, 11, 12 or 13 in a sheet form An adhesive epoxy resin sheet of the invention according to claim 19 is the adhesive epoxy resin sheet of claim 18, wherein a heat-cured product obtained by heat curing at a temperature rising rate of 45° C./min has a storage modulus (G') exceeding $1 \times 10^3$ Pa.

An adhesive epoxy resin sheet of the invention according to claim 20 is the adhesive epoxy resin sheet of claim 18 or 19, wherein the peak temperature of tan δ based on dynamic viscoelasticity is in a range of −20° C. to 40° C. before curing and 120° C. or higher after curing.

A non-conductive film of the invention according to claim 21 (hereinafter referred to the eighth invention) comprises the adhesive epoxy resin sheet according to claim 18, 19 or 20.

A die attach film of the invention according to claim 22 (hereinafter referred to the ninth invention) comprises the adhesive epoxy resin sheet according to claim 18, 19 or 20.

A conductive connection paste of the invention according to claim 23 (hereinafter referred to the tenth invention) is characterized in that conductive fine particles are contained in the adhesive epoxy resin paste according to claim 14.

An anisotropic conductive paste of the invention according to claim 24 (hereinafter referred to the eleventh invention) comprises the conductive connection paste according to claim 23.

A conductive connection sheet of the invention according to claim 25 (hereinafter referred to the twelfth invention) comprises the adhesive epoxy resin sheet according to claim 18, 19 or 20 and conductive fine particles, at least a part of the conductive fine particles being exposed out of the adhesive epoxy resin sheet.

A conductive connection sheet of the invention according to claim 26 (hereinafter referred to the thirteenth invention) is obtainable by embedding conductive fine particles smaller than the thickness of the adhesive epoxy resin sheet in the adhesive epoxy resin sheet according to claim 18, 19 or 20.

An anisotropic conductive film of the invention according to claim 27 (hereinafter referred to the fourteenth invention) comprises the conductive connection sheet according to claim 26.

A conductive connection sheet of the invention according to claim 28 (hereinafter referred to the fifteenth invention) is formed by a pressure sensitive adhesive resin sheet comprising a pressure sensitive resin composition containing a resin provided with a pressure sensitive adhesive property by addition of a plasticizer and an epoxy resin having a naphthalene skeleton in liquid phase at normal temperature and conductive fine particles, the pressure sensitive adhesive resin sheet having a peak temperature of tan δ based on dynamic viscoelasticity in a range of −20° C. to 40° C. before curing and 120° C. or higher after curing and the conductive fine particles being arranged at any positions of the pressure sensitive adhesive resin sheet and at least a part of the conductive fine particles being exposed out of the pressure sensitive adhesive resin sheet.

A non-conductive film of the invention according to claim 29 comprises the conductive connection sheet according to claim 28, wherein the pressure sensitive adhesive resin sheet after curing has an elongation percentage of 5% or lower after a pressure cooker test carried out under conditions of a temperature of 120° C. and a humidity of 85% RH for 12 hours.

A flip chip tape of the invention according to claim 30 (hereinafter referred to the sixteenth invention) comprises a conductive connection sheet according to claim 25, 28 or 29.

An electronic component joined body of the invention according to claim 31 (hereinafter referred to the seventeenth invention) is obtainable by joining a bump-shaped projected electrode of an electronic part to another electrode in electrically connected state by any of the curable resin composition according to claim 1, 2, 3, 4, 5, 6, 7, 8, 9, 10, 11, 12 or 13, the adhesive epoxy resin paste according to claim 14, the interlayer adhesive according to claim 15, the non-conductive paste according to claim 16, the underfill according to claim 17, the conductive connection paste according to claim 23, the anisotropic conductive paste according to claim 24, the adhesive epoxy resin sheet according to claim 18, 19 or 20, a non-conductive film according to claim 21, the die attach film according to claim 22, the conductive connection sheet according to claim 25, 26, 28 or 29, the anisotropic conductive film according to claim 27 and the flip chip tape according to claim 30.

An electronic component joined body of the invention according to claim 32 (hereinafter referred to the eighteenth invention) is obtainable by joining at least one kind circuit substrate selected from a group consisting of a metal lead frame, a ceramic substrate, a resin substrate, a silicon substrate, a compound semiconductor substrate, and a glass substrate by any of the curable resin composition according to claim 1, 2, 3, 4, 5, 6, 7, 8, 9, 10, 11, 12 or 13, the adhesive epoxy resin paste according to claim 14, the interlayer adhesive according to claim 15, the non-conductive paste according to claim 16, the underfill according to claim 17, the conductive connection paste according to claim 23, the anisotropic conductive paste according to claim 24, the adhesive epoxy resin sheet according to claim 18, 19 or 20, a non-conductive film according to claim 21, the die attach film according to claim 22, the conductive connection sheet according to claim 25, 26, 28 or 29, the anisotropic conductive film according to claim 27 and the flip chip tape according to claim 30.

An electronic component joined body of the invention according to claim 33 is the electronic component joined body according to claim 32, wherein the resin substrate is a glass epoxy substrate, a bismaleimidetriazine substrate or a polyimide substrate.

DETAILED DESCRIPTION OF THE INVENTION

Hereinafter the invention will be described more in detail.

The curable resin composition of the first invention contains an epoxy resin, a solid polymer having a functional group react with the epoxy group and a curing agent for an epoxy resin and no phase separation structure is observed in a matrix of the resin when the cured product is dyed with a heavy metal and observed with a transmission electron microscope.

The curable resin composition of the first invention shows no phase separation structure in a matrix of the resin when the cured product of the composition is dyed with a heavy metal and observed with a transmission electron microscope. It is well known that the inside of a polymer material can be observed by the transmission electron microscope (TEM) and the method is observing the difference of components in a resin material as the color concentration of a dye by dyeing the polymer material composition with a heavy metal such as osmium tetraoxide, ruthenium tetraoxide, phosphorus tungstate, and the like.

In this description, the cured product means a product obtainable by heat curing the curable resin composition of the invention in conditions of 170° C. for 30 minutes, for example.

Generally, a polymer component is added to an epoxy resin so as to provides various functions and the like to the resin composition to be obtained and for example, in the case where the resin composition is to be formed into a sheet-like material, the polymer component is added as a film formability improvement component and in the case where the resin composition is to be formed into a paste material, the polymer component is added so as to increase the strength of the cured resin and provide high reactivity. However, the epoxy resin and the polymer component to be added to the epoxy resin are not compatible unless the compatibility of the epoxy resin after curing and the added polymer component is extremely high.

The resin composition having phase separation structure by adding the polymer component to the epoxy resin is supposed to have an effect to relax the stress by the added polymer component, however the polymer component itself is not dissolved in the epoxy resin itself to be a matrix and therefore, improvement of the strength of the cured product of the resin composition is limited.

The curable resin composition of the first invention shows no phase separation structure in a matrix of the resin in the case of observation of the cured product of the composition with a transmission electron microscope. That is, in the curable resin composition of the first invention, it is supposed that the resin components are completely compatible.

The state in which the epoxy resin and the resin added to the epoxy resin are completely compatible means that the polymer to be added indispensably comprises either epoxy group itself or a functional group to react with an epoxy group in the structure.

That is, the curable resin composition of the first invention contains the epoxy resin and a solid polymer having a functional group to react with the epoxy group.

The epoxy resin is not particularly limited and is preferably an epoxy resin having a polycyclic hydrocarbon skeleton as a main chain. It is because if the epoxy resin having a polycyclic hydrocarbon skeleton as a main chain is contained, the cured product becomes rigid and therefore inhibits molecular movement to exhibit high mechanical strength and heat resistance and have excellent moisture resistance owing to low water absorbability.

The epoxy resin having polycyclic hydrocarbon skeleton as a main chain is not particularly limited and examples of the epoxy resin may include epoxy resins having dicyclopentadiene skeletons (hereinafter, referred to as dicyclopentadiene type epoxy resins) such as phenol novolak epoxy resins having dicyclopentadiene dioxide or dicyclopentadiene skeleton; epoxy resins having naphthalene skeletons (hereinafter, referred to as naphthalene type epoxy resins) such as 1-glycidylnaphthalene, 2-glycidylnaphthalene, 1,2-diglycidylnaphthalene, 1,5-diglycidylnaphthalene, 1,6-diglycidylnaphthalene, 1,7-diglycidylnaphthalene, 2,7-diglycidylnaphthalene, triglycidylnaphthalene, and 1,2,5,6-tetraglycidylnaphthalene; tetrahydroxyphenylethane type epoxy resin; tetrakis(glycidyloxyphenyl)ethane; and 3,4-epoxy-6-methylcyclohexylmethyl-3,4-epoxy-6-methylcyclhexane carbonate and among them, dicyclopentadiene type epoxy resins and naphthalene type epoxy resins are preferable to be used. These epoxy resins having polycyclic hydrocarbon skeletons as a main chain may be used alone or two or more may be used in combination. The dicyclopentadiene type epoxy resins and the naphthalene type epoxy resins may be used independently or in combination with each other.

The epoxy resin having a polycyclic hydrocarbon skeleton as a main chain is not particularly limited and is preferable to have a molecular weight of 500 as the lower limit and 1,000 as the upper limit. If the molecular weight of the epoxy resin having a polycyclic hydrocarbon skeleton as a main chain is lower than 500, the mechanical strength, heat resistance, and moisture resistance and the like of the cured product of the curable resin composition may not be improved sufficiently in some cases and on the contrary, if the molecular weight of the epoxy resin having a polycyclic hydrocarbon skeleton as a main chain is more than 1,000, the cured product of the curable resin composition sometimes becomes so rigid as to be fragile.

The solid polymer having a functional group to react with the epoxy group is not particularly limited and resins having an amino group, an urethane group, an imido group, a hydroxyl group, a carboxyl group, and an epoxy group can be, exemplified and among them, high molecular polymers having an epoxy group are preferable. It is because if the high molecular polymers having an epoxy group are contained, the cured product is provided with excellent flexibility. That is, the cured product of the curable resin composition of the first invention is provided with high mechanical strength, heat resistance, and moisture resistance and the like attributed to the epoxy resin having the polycyclic hydrocarbon skeleton as a main chain as well as excellent flexibility attributed to the high molecular polymer having an epoxy group and therefore the cured product is excellent in the resistance to thermal cycles, resistance to solder reflow, and dimensional stability and the like and provides high adhesion reliability and conduction reliability.

The high molecular polymer having an epoxy group is not particularly limited if it is a high molecular polymer having an epoxy group in the terminals and/or side chains (pendant sites) and examples may include an epoxy group containing acrylic rubber, an epoxy group containing butadiene rubber, bisphenol type high molecular weight epoxy resin, an epoxy group containing phenoxy resin, an epoxy group containing acrylic resin, an epoxy group containing urethane resin, and an epoxy group containing polyester resin and among them, an epoxy group containing acrylic resin is preferable to be used since a high molecular polymer having a large quantity of epoxy group can be obtained and the mechanical strength and the heat resistance of the cured product of the curable resin composition of the first invention can be improved further. These epoxy group-containing high molecular polymers may be used alone or two or more of them may be used in combination.

In the case of using only the bisphenol type high molecular weight epoxy resin, the epoxy group is contained only in the terminals and the intervals of the crosslinking points become long and therefore, the mechanical strength and the heat resistance of the cured product of the curable resin composition are not sufficiently improved.

Further, generally, the acrylic resin (acrylic polymers) is often produced by solution polymerization method using a solvent as a medium, however in the solution polymerization method, at the time of producing an acrylic resin with a high molecular weight, the viscosity of the solution may possibly be increased extremely and in some cases gelling of the solution occurs and consequently, it is difficult to obtain an acrylic resin with a high molecular weight. Further, in the case of the solution polymerization method, since un-reacted monomers tend to remain, it is needed to remove the remaining monomers together with the solvent and thus the production process is complicated.

For example, if solution polymerization is carried out by adding a large quantity of glycidyl methacrylate (GMA) as an epoxy group-containing acrylic monomer to an other acrylic monomer, only an epoxy group-containing acrylic resin with a relatively low molecular weight (less than 10,000) can be obtained owing to agglomeration of epoxy groups themselves and if it is aimed to obtain an epoxy group-containing acrylic resin with a higher molecular weight, the extreme increase of the viscosity and gelling tend to take place easily.

On the other hand, if suspension polymerization is carried out using the GMA in water or a nonsolvent as a medium to produce the epoxy group-containing acrylic resin, an epoxy group-containing acrylic resin with a higher molecular weight and containing a large quantity of epoxy groups can be obtained. The epoxy group-containing acrylic resin is almost free from monomers and thus is a clean resin and at the same time it is easy to be separated from the polymerization system, resulting in simplification of the production process.

Accordingly, the high molecular polymer having an epoxy group, preferably the epoxy group-containing acrylic resin, to be used in the curable resin composition of the first invention is preferable to be a high molecular polymer having an epoxy group which is produced by the suspension polymerization method. Use of the high molecular polymer having an epoxy group, preferably the epoxy group-containing acrylic resin, which is produced by the suspension polymerization method provides further improved mechanical strength and heat resistance to the cured product of the curable resin composition of the first invention.

The high molecular polymer having an epoxy group, preferably the epoxy group-containing acrylic resin, is preferable to have a weight-average molecular weight of 10,000 or higher. If the weight-average molecular weight of the high molecular polymer having an epoxy group, preferably the epoxy group-containing acrylic resin, is lower than 10,000, the film formability of the curable resin composition becomes insufficient and the flexibility of the cured product of the curable resin composition is sometimes not improved sufficiently.

It is also preferable that the high molecular polymer having an epoxy group, preferably the epoxy group-containing acrylic resin, has an epoxy equivalent of 200 as a lower limit and 1,000 as an upper limit. If the epoxy equivalent of the high molecular polymer having an epoxy group, preferably the epoxy group-containing acrylic resin, is less than 200, the flexibility of the cured product of the curable resin composition is sometime not improved sufficiently and on the contrary, if the epoxy equivalent of the high molecular polymer having an epoxy group, preferably the epoxy group-containing acrylic resin, is more than 1,000, the mechanical strength and the heat resistance of the cured product of the curable resin composition are not sometimes improved sufficiently.

The cured product of the curable resin composition of the first invention is preferable to have a single tan δ peak in viscoelasticity spectrometry and the peak temperature of 120° C. or higher.

That the resin matrix of the resin composition obtainable by adding the polymer component to the epoxy resin has a phase separation structure can be observed by observation with a transmission electron microscope (TEM) and the fact that the resin matrix has the phase separation structure can also be known easily by measuring the viscoelasticity spectra of the cured product.

That is, if the resin matrix of the cured product has a phase separation structure, the tan δ of the viscoelasticity does not show a single peak, and for example two peaks appear in the case where the phase structure comprises two layers and three peaks in the case where the phase structure comprises three layers.

The peak of tan δ in the description means a peak particularly outstanding as compared with others.

If the temperature of the peak of tan δ is lower than 120° C., the resin softening occurs in a temperature range around 120° C. to be used conventionally in a reliability test and accordingly, it results in water penetration and interface delamination at the time of a thermal cycle test in some cases.

The cured product of the curable resin composition of the first invention is preferable to be swollen not so much in a dimethyl sulfoxide (DMSO) solution heated at 120° C. Practically, the cured product is preferable to have a swelling ratio of 50% or less in the case of measurement in the dimethyl sulfoxide (DMSO) solution heated at 120° C. The fact that the swelling ratio is more than 50% means that the crosslinking is loose at that temperature and water molecules and oxygen molecules extremely easily penetrate the cured product. Accordingly, if the swelling ratio is more than 50%, the reliability of the curable resin composition of the first invention as an adhesive may possible be decreased.

As described above, since the curable resin composition of the first invention has no phase separation structure in the resin matrix of the cured product, the swelling ratio measured in the dimethyl sulfoxide (DMSO) solution heated at 120° C. is 50% or less. In the case of a resin composition comprising an epoxy resin and a polymer component phase-separable from the epoxy resin, the phase structure of the cured product is composed of the epoxy crosslinked phase (the epoxy resin phase) and the polymer phase. However, the epoxy crosslinked phase is easy to have a glass transition temperature (Tg) of 120° C. or higher and does not swell, and on the other hand, although the polymer phase has crosslinking groups in the structure, the quantity of the groups is not so much and therefore the polymer phase has a relatively loose crosslinked structure and thus is swollen rather much in the case of observation of the swelling ratio around 120° C.

In the curable resin composition of the first invention, it is preferable that the epoxy resin is an epoxy resin having the polycyclic hydrocarbon skeleton as the main chain and the solid polymer having the functional group to react with the epoxy group is a high molecular polymer having an epoxy group and no inorganic filler is contained.

Generally, to improve the reliability of an adhesive for electronic materials, it is indispensable to add a large quantity of an inorganic filler. It is well known that addition of the inorganic filler improves water absorbability and the elastic modulus and moisture resistance and the like as well, however inorganic filler particles are meshed between electrodes at the time of pressure bonding of the electrodes and particularly in the case of bonding electrodes at a narrow gap, bonding failure sometimes takes place owing to the existence of the inorganic filler.

Spherical silica can be exemplified as the commonly used inorganic filler and the spherical silica basically has a particle size distribution and it is highly possible to include very rough and large particles. Particularly, in the case of adding a large quantity of the inorganic filler (the spherical silica), the probability of existence of very rough and large particles is so high to easily cause the problem.

In consideration of these problems described above, the curable resin composition of the first invention is preferable to contain no inorganic filler.

If the inorganic filler has an even and extremely narrow particle size distribution and has a very small maximum particle diameter, the problem is scarcely caused. Accordingly, if the inorganic filler is such an inorganic filler, the curable resin composition of the first invention may contain it. Practically, it is preferable that the inorganic filler has the maximum particle diameter of 3 μm or smaller and is added in an amount of 30 parts by weight or less in 100 parts by weight of the entire resin.

If the curable resin composition contains the inorganic filler with a maximum particle diameter larger than 3 μm, the problem tends to be caused easily and in the case where the curable resin composition of the first invention is used for a substrate which needs to have via holes, the roundness of the through holes at the time of laser processing is deteriorated and the smoothness of the processed surface of the via holes is sometimes lost by the inorganic filler.

The inorganic filler containing no rough and large particle and having the maximum particle diameter of 3 μm or smaller is not particularly limited and, for example, silica such as fumed silica, colloidal silica, glass fiber, and alumina fine particles can be exemplified and among them, silica is preferable to be used and hydrophobic silica surface-treated for hydrophobicity is more preferable to be used. These inorganic fillers may be used alone or two or more of them may be used in combination. In the curable resin composition of the first invention, if the maximum particle diameter is 3 μm or smaller, an organic filler made of a finely granular organic material with a low molecular weight may be contained.

In the case where the inorganic filler having the maximum particle diameter of 3 μm or smaller is contained to the curable resin composition of the first invention, if the addition amount is more than 30 parts by weight to 100 parts by weight in the total of the epoxy resin having the polycyclic hydrocarbon skeleton in the main chain and the high molecular polymer having an epoxy group, the roundness of the through holes at the time of laser processing is deteriorated in the case where the curable resin composition of the first invention is used for a substrate which needs to have via holes and the smoothness of the processed surface of the via holes is sometimes lost by the inorganic filler and the coatability of the curable resin composition is sometimes deteriorated because the viscosity of the curable resin composition is so much increased.

The curable resin composition of the first invention is preferable to contain a low elastic modulus substance having elastic modulus (G') in a range of $1 \times 10^5$ to $1 \times 10^8$ Pa at 20° C. and the low elastic modulus substance is dispersed like an island in non-compatible state in the curable resin composition.

Owing to existence of the low elastic modulus substance having elastic modulus (G') in a range of $1 \times 10^5$ to $1 \times 10^8$ Pa at 20° C. in non-compatible state and being dispersed like an island in the curable resin composition, the cured product of the curable resin composition of the first invention is provided with a sea-island structure and accordingly has better mechanical strength, heat resistance and better flexibility as well and as a whole the cured product exhibits excellent toughness and strength.

If the elastic modulus (G') of the low elastic modulus substance is lower than $1 \times 10^5$ Pa at 20° C., the mechanical strength and the heat resistance of the cured product of the curable resin composition is sometimes not improved sufficiently and on the contrary, if elastic modulus (G') of the low elastic modulus substance is higher than $1 \times 10^8$ Pa at 20° C., the flexibility of the cured product of the curable resin composition is sometimes not improved sufficiently. Further, if the low elastic modulus substance is compatible with the curable resin composition, the sea-island structure is not formed in the cured product of the curable resin composition, so that the effect cannot be caused sufficiently in some cases.

The low elastic modulus substance is not particularly limited if it has elastic modulus (G') of $1\times10^5$ Pa as a lower limit and $1\times10^8$ Pa as a higher limit at 20° C. and non-compatible in the curable resin composition and for example, various kinds of thermoplastic resins, various kinds of thermosetting resins, and various kinds of rubbers (various kinds of elastomers) can be exemplified. These low elastic modulus substances may be used alone or two or more of them can be used in combination.

The curable resin composition of the second invention contains an epoxy resin composition obtainable by mixing a dicyclopentadiene type epoxy resin, a naphthalene type epoxy resin, and a curing agent for epoxy resins and rubber particles having a core-shell structure of which the core has a glass transition temperature of 20° C. or lower and the shell has a glass transition temperature of 40° C. or higher.

The dicyclopentadiene type epoxy resin contained in the epoxy resin composition-means an epoxy resin having an epoxy group-containing dicyclopentadiene skeleton and since the dicyclopentadiene type epoxy resin has excellent hydrophobicity, addition of the dicyclopentadiene type epoxy resin to the epoxy resin composition makes the curable resin composition of the second invention hydrophobic and the cured product has low water absorbability and is provided with high hydrophobicity even in high temperature and high humidity environments represented by a pressure cooker test and the like.

The dicyclopentadiene type epoxy resin is preferable to have low polymerization degree and/or softening point. Use of such a dicyclopentadiene type epoxy resin increases the fluidity of the paste in the case where the curable resin composition of the second invention is to be used, for example, as an adhesive epoxy resin paste and the use provides proper flexibility to the sheet before curing and makes the sheet hard to be cracked in the case where the curable resin composition of the second invention is used, for example, as an adhesive epoxy resin sheet.

The dicyclopentadiene type epoxy resin is not particularly limited and for example, phenol-novolak epoxy resins having dicyclopentadiene oxide and dicyclopentadiene skeleton. These dicyclopentadiene type epoxy resins may be used alone or two or more of them may be used in combination.

The naphthalene type epoxy resin contained in the epoxy resin composition means an epoxy resin having an epoxy group-containing naphthalene skeleton and in the second invention, a naphthalene type epoxy resin in liquid state at normal temperature is preferable to be used. Since the naphthalene type epoxy resin has a rigid naphthalene skeleton, in the case where the curable resin composition of the second invention is used, for example, as an adhesive epoxy resin sheet, the sheet after curing is provided with a high shape-retaining property even in high temperature and high humidity environments and exhibits high moisture resistant adhesive property.

In the case where the curable resin composition of the second invention is used for, for example, an adhesive epoxy resin paste, the naphthalene type epoxy resin is preferable to have a low viscosity. Also, in the case where the curable resin composition of the second invention is used, for example, for an adhesive epoxy resin sheet, the naphthalene type epoxy resin generally contains isomers and therefore has a melting point of normal temperature or lower, so that flexibility of the sheet can be improved at normal temperature and the sheet before curing is made hard to be cracked and the curing speed can be accelerated.

The naphthalene type epoxy resin in liquid state at normal temperature is not particularly limited and examples thereof are 1-glycidylnaphthalene, 2-glycidylnaphthalene, 1,2-diglycidylnaphthalene, 1,5-diglycidylnaphthalene, 1,6-diglycidylnaphthalene, 1,7-diglycidylnaphthalene, 2,7-diglycidylnaphthalene, triglycidylnaphthalene, and 1,2,5,6-tetraglycidylnaphthalene. These naphthalene type epoxy resins may be used alone or two or more of them may be used in combination.

The number of the epoxy groups to be contained in the dicyclopentadiene type epoxy resin and naphthalene type epoxy resin is not particularly limited and it is preferably one or more in average per one molecule and more preferably two or more in average per one molecule. The number of the epoxy groups per one molecule can be calculated by dividing the total number of epoxy groups in the dicyclopentadiene type epoxy resin or the total number of epoxy groups in the naphthalene type epoxy resin by the total number of the molecules of the dicyclopentadiene type epoxy resin or the total number of the molecules of the naphthalene type epoxy resin.

The epoxy resin composition may further contain an epoxy resin and an epoxy group-containing compound if necessary, other than the dicyclopentadiene type epoxy resin and the naphthalene type epoxy resin.

The curable resin composition of the first and the second inventions contain a curing agent for epoxy resins (hereinafter, simply referred to as a curing agent in some cases) which reacts on the epoxy groups in the epoxy resin having the polycyclic hydrocarbon skeleton in the main chain, the epoxy groups of the high molecular polymer having an epoxy group, the epoxy groups in the dicyclopentadiene type epoxy resin and the epoxy groups in the naphthalene type epoxy resin contained in the epoxy resin composition and which cures the epoxy resin having the polycyclic hydrocarbon skeleton in the main chain, the high molecular polymer having an epoxy group, the dicyclopentadiene type epoxy resin, and the naphthalene type epoxy resin.

Since the curable resin composition of the first invention and the epoxy resin composition of the curable resin composition of the second invention contain the curing agent for epoxy resins, the epoxy resin having the polycyclic hydrocarbon skeleton in the main chain, the high molecular polymer having an epoxy group, the dicyclopentadiene type epoxy resin, and the naphthalene type epoxy resin are quickly and firmly cured preferably under heating condition and cured products of the curable resin compositions of the first and the second inventions are provided with high mechanical strength, heat resistance, moisture resistance, flexibility, resistance to thermal cycles, resistance to solder reflow, and dimensional stability and exhibit high adhesion reliability and conduction reliability at the time of using the compositions as conductive materials.

The curing agent for epoxy resins is not particularly limited and heat curable type acid anhydride type curing agents such as trialkyltetrahydrophthalic anhydride; phenol type curing agents; amine type curing agents; latent curing agents such as dicyandiamide; and cationic catalytic type curing agents can be exemplified. These curing agents for epoxy resins may be used alone or two or more of them may be used in combination.

Among the curing agents for epoxy resins, heat curable type curing agents in liquid state at normal temperature and the latent curing agents such as dicyandiamide which are polyfunctional and effective even by addition of a small amount in terms of equivalent are preferable to be used. In the case of producing adhesive epoxy resin sheets using the curable resin compositions of the first and the second inventions, use of such curing agents makes it possible to produce sheets soft at normal temperature and easy to handle before curing. On the contrary, the phenol type curing agents which are solid at normal temperature and added in a large addition amount in terms of equivalent rather increase the glass transition temperature (Tg) of the sheets themselves before curing and make the sheets easy to be cracked in the initial stage and inferior in the handling property and therefore, these curing agents are not preferable.

Typical examples of the heat curing type curing agents in liquid state at normal temperature may include acid anhydride curing agents such as methyltetrahydrophthalic anhydride, methylhexahydrophthalic anhydride, methylnadic anhydride, and trialkyltetrahydrophthalic anhydride and among them, being hydrophobic, methylnadic anhydride, and trialkyltetrahydrophthalic anhydride are preferable to be used. On the contrary, methyltetrahydrophthalic anhydride and methylhexahydrophthalic anhydride are inferior in the water resistance and therefore not preferable. These acid anhydride type curing agents may be used alone and two or more of them may be used in combination.

In the curable resin compositions of the first and the second inventions, to adjust the curing speed and physical properties of cured products, a curing accelerator may be used in combination of the curing agent for epoxy resins.

The curing accelerator is not particularly limited and for example, imidazole type curing accelerators and tertiary amine type curing accelerators can be exemplified and among them, the imidazole type curing accelerators are preferably used since it is made easy to control the reaction system for adjusting the curing speed and physical properties of cured products. These curing accelerators may be used alone and two or more of them may be used in combination.

The imidazole type curing accelerator is not particularly limited and for example, 1-cyanoethyl-2-phenylimidazole of which the 1-site of the imidazole is protected with cyanoethyl group and 2MA-OK (trade name, produced by Shikoku Corp.) in which the basicity is protected with isocyanuric acid. These imidazole type curing accelerators may be used alone or two or more of them may be used in combination.

In the case where the acid anhydride type curing agent and the curing accelerator such as the imidazole type curing accelerator are used in combination, the addition amount of the acid anhydride type curing agent is preferable to be theoretically equivalent or lower to the epoxy groups. If the addition amount of the acid anhydride type curing agent is unnecessarily in excess, it becomes possible that chlorine ion may easily be eluted owing to the water from the cured products of the curable resin compositions of the first and the second inventions. For example, when the eluting components are extracted from the cured products of the curable resin compositions of the first and the second inventions with hot water, the pH of the extracted water is lowered to around 4 to 5 and a large quantity of the chlorine ion depleted from the epoxy resins are eluted in some cases.

Further, in the case where the amine type curing agent is used in combination with a curing accelerator such as an imidazole type curing accelerator, the addition amount of the amine type curing agent is preferable to be theoretically equivalent or lower to the epoxy groups. If the addition amount of the amine type curing agent is unnecessarily in excess, it becomes possible that chlorine ion may easily be eluted owing to the water from the cured products of the curable resin compositions of the first and the second inventions. For example, when the eluting components are extracted from the cured products of the curable resin compositions of the first and the second inventions with hot water, the pH of the extracted water becomes basic and also a large quantity of the chlorine ion depleted from the epoxy resins are eluted in some cases.

The curable resin composition of the second invention contains rubber particles having a core-shell structure of which the core (core material) has a glass transition temperature of 20° C. or lower and the shell (outer shell) has a glass transition temperature of 40° C. or higher in the epoxy resin composition. Addition of such rubber particles makes the cured product of the curable resin composition of the second invention have stable phase separation structure of the rubber component to the epoxy resin which is a matrix resin and accordingly provides flexibility and excellent stress relaxation property.

The rubber particles have core-shell structure of which the core has a glass transition temperature of 20° C. or lower and the shell has a glass transition temperature of 40° C. or higher. The rubber particles may be core-shell structure particles having a layered structure of two or more layers, and in the case of core-shell structure particles having a layered structure of three or more layers, the shell means the outermost shell.

If the glass transition temperature of the core of the rubber particles is higher than 20° C., the stress relaxation property of the cured product of the curable resin composition of the second invention is not sufficiently improved. If the glass transition temperature of the shell of the rubber particles is lower than 40° C., the rubber particles are fused (agglomerated) or dispersed inferiorly in the epoxy resin composition. Additionally, the shell of the rubber particles is preferable to be non-compatible with the epoxy resin or be slightly gelling by crosslinking so as to be insoluble in the epoxy resin.

As a resin component composing such rubber particles, any resin components which can give a glass transition temperature of 20° C. or lower of the core and a glass transition temperature of 40° C. or higher of the shell can be used and not particularly limited, however since the planed glass transition temperature range is wide, generally acrylic resins are used preferably. These resin components may be used alone or two or more of them may be used in combination.

The shell of the rubber particles may have a functional group to react with the epoxy group of the epoxy resin. The functional group to react with the epoxy group is not particularly limited and for example, an amino group, an urethane group, an imido group, a hydroxyl group, a carboxyl group, and an epoxy group can be exemplified and among them, a hydroxyl group and an epoxy group are preferable to be used, since they do not react with an epoxy group at normal temperature and do not deteriorate the wettability and the storage stability of the curable resin composition of the second invention. These functional groups to react with an epoxy group may be used alone or two or more of them may be used in combination.

The rubber particles are not particularly limited, however the particles are preferable to have an average particle diameter of 30 μm or smaller. If the average particle diameter of the rubber particles is more than 30 μm, the cured product of the curable resin composition of the second invention is sometimes not improved sufficiently. Also, in the case where the curable resin composition of the second invention is used for, for example, an adhesive epoxy resin paste, the fluidity becomes insufficient and the coatability and filling property in gaps may possibly be deteriorated and in the case where the curable resin composition of the second invention is used for, for example, an adhesive epoxy resin sheet, it sometimes becomes difficult to form a sheet with thin thickness.

Commercialized products of the rubber particles are not particularly limited and examples may include a series of Paracron such as Paracron RP-101, Paracron RP-103, and Paracron RP-412 produced by Negami Chemical Industrial Co., Ltd.; a series of Staphyloid such as Staphyloid IM-101, Staphyloid IM-203, Staphyloid IM-301, Staphyloid IM-401, Staphyloid IM-601, Staphyloid AC-3355, Staphyloid AC-3364, Staphyloid AC-3816, Staphyloid AC-3832, and Staphyloid AC-4030 produced by Ganz Chemical Co., Ltd.; a series of Zeon such as Zeon F 351 produced by Zeon Kasei Co., Ltd.; and a series of Metablen such as Metablen C-140A, Metablen C-201A, Metablen C-215A, Metablen C-223A, Metablen C-303A, Metablen C-323A, Metablen C-102, Metablen C-132, Metablen C-202, Metablen E-901, Metablen W-341, Metablen W-300A, Metablen W-450A, Metablen S-2001, Metablen SX-005, Metablen SX-006, and Metablen SRK 200 produced by Mitsubishi Rayon Co., Ltd. Also, commercialized products of epoxy resins in which rubber particles are previously dispersed are not particularly limited and examples may include a series of Eposet such as Eposet BPA-828 and Eposet BPF-807 produced by Nippon Shokubai Co., Ltd. These rubber particles and epoxy resins in which the rubber particles are previously dispersed may be used alone and two or more of them may be used in combination.

The curable resin composition of the second invention may contain a thermoplastic resin and a thermosetting resin if necessary.

The thermoplastic resin is not particularly limited and examples of the thermoplastic resin may include vinyl acetate type resins, ethylene-vinyl acetate copolymers, acrylic resins, polyvinyl acetal type resins such as polyvinyl butyral resin, styrene type resins, saturated polyester type resins, thermoplastic urethane type resins, polyamide type resins, thermoplastic polyimide type resins, ketone type resins, norbornene type resins, and styrene-butadiene type block copolymers. These thermoplastic resins may be used alone or two or more of them may be used in combination.

The thermosetting resin is not particularly limited and examples of the thermosetting resin may include amino type resins such as urea resin, and melamine resin, phenol type resins, unsaturated polyester type resins, thermosetting urethane type resins, epoxy resins other than the pentadiene type epoxy resin and naphthalene type epoxy resin, thermosetting polyimide type resins, and aminoalkyd resins. These thermosetting resins may be used alone or two or more of them may be used in combination. Further, the thermoplastic resins and thermosetting resins may be used alone or both in combination.

In the case where the curable resin composition of the second invention is used as a paste-like adhesive epoxy resin paste, the thermoplastic resin or thermosetting resin work as a tackifier. In this case, the weight-average molecular weight of the thermoplastic resin or thermosetting resin is not particularly limited unless the viscosity of the paste is so extremely increased. If necessary, the viscosity of the paste may be adjusted by adding a solvent.

In the case where the curable resin composition of the second invention is used, for example, as an adhesive epoxy resin sheet formed in a sheet form on a separator (a release sheet or a release sheet of paper), to assure good sheet formability, the thermoplastic resin and thermosetting resin are preferable to be high molecular polymers having a relatively high glass transition temperature. In this case, the thermoplastic resin and thermosetting resin are not particularly limited, however they are preferable to have a weight-average molecular weight of 10,000 or higher, more preferably 100,000 or higher. If the weight-average molecular weight of the thermoplastic resin and thermosetting resin is less than 10,000, the cohesion force of the sheet itself is so insufficient to repulse a material to be applied such as an adhesive or a coating material applied to the sheet or the sheet itself causes cohesion failure at the time of delamination of the separator.

The thermoplastic resin and thermosetting resin are preferable to have a functional group to react with an epoxy group. Existence of the functional group in the thermoplastic resin and thermosetting resin provides further improved mechanical strength and heat resistance to the cured product of the curable resin composition of the second invention.

The functional group to react with an epoxy group is not particularly limited and for example, an amino group, an urethane group, an imido group, a hydroxyl group, a carboxyl group, and an epoxy group can be exemplified. These groups to react with an epoxy group may be used alone or two or more of them may be used in combination.

In the case where the curable resin composition of the second invention is used as an adhesive epoxy resin paste with adjusted viscosity with a solvent or as an adhesive epoxy resin sheet formed by a solvent cast method, it is preferable to use a hydroxyl group and an epoxy group which do not react with an epoxy group at at a temperature of around 110° C. for drying the solvent and do react with an epoxy group at a temperature of 150 to 230° C. among the functional groups to react with an epoxy group. The resin having a hydroxyl or an epoxy group is not particularly limited and for example, polyvinyl butyral resins and epoxy group-containing acrylic resins can be exemplified.

If an amino group or a carboxyl group is used as the functional group to react with an epoxy group, in the case where the curable resin composition of the second invention is used as adhesive epoxy resin paste with adjusted viscosity with a solvent or as an adhesive epoxy resin sheet formed by a solvent cast method, the amino group or carboxyl group reacts on an epoxy group at a temperature of around 110° C. for drying the solvent and the paste and sheet are semi-cured (in B-stage state) during the drying or molding to result in deterioration of coatability of the paste and decrease of adhesion property and moisture resistant adhesive property of the paste and sheet to an adherend.

Further, the equivalent of the functional group to react with an epoxy group of one thermoplastic resin or thermosetting resin is not particularly limited, however it is preferably 10,000 or lower and more preferably 1,000 or lower. Use of the thermoplastic resin or thermosetting resin having the functional group to react with an epoxy group in the equivalent amount of the range makes the cured product of the curable resin composition of the second invention possible to form a network with a high crosslinking density. Additionally, the equivalent of the functional group to react with epoxy resin means the value calculated by dividing the weight-average molecular weight of the thermoplastic resin or thermosetting resin by the total number of the functional group to react with an epoxy group which exists in one thermoplastic resin or thermosetting resin.

The curable resin composition of the first invention may contain, if necessary, rubber particles having a core-shell structure of which the core has a glass transition temperature of 20° C. or lower and the shell has a glass transition temperature of 40° C. or higher contained in the curable resin composition of the second invention and the thermoplastic resin and thermosetting resin which may be contained in the curable resin composition of the second invention.

The curable resin composition of the second invention may contain, if necessary, the high molecular polymer having an epoxy group, which is contained in the curable resin composition of the first invention. The curable resin composition of the second invention is also preferable to contain no filler having an average particle diameter being more than 3 μm.

The curable resin compositions of the first and the second inventions may further contain, if necessary, one or more kinds of various additives such as an adhesion property improver, a pH adjuster, an ion scavenger, a viscosity adjuster, a thixotropy providing agent, an antioxidant, a heat stabilizer, a photo-stabilizer, a UV absorbent, a coloring agent, a dehydrating agent, a flame retardant, an antistatic agent, an anti-mold agent, a preserver, and a solvent.

The adhesion property improver is not particularly limited and for example, a silane coupling agent, a titanium coupling agent, and an aluminum coupling agent may be exemplified and among them, the silane coupling agent is used preferably. These adhesion property improvers may be used alone or two or more of them may be used in combination.

The silane coupling agent is not particularly limited and for example, an aminosilane coupling agent, an epoxysilane coupling agent, an ureidosilane coupling agent, an isocyanatosilane coupling agent, a vinylsilane coupling agent, an acrylsilane coupling agent, and a ketiminosilane coupling agent may be exemplified and among them, in terms of the curing speed and the affinity with the epoxy resin, the aminosilane coupling agent is used preferably. These silane coupling agents may be used alone or two or more of them may be used in combination.

The addition amount of the adhesion property improver is not particularly limited, however it is preferable to add 20 parts by weight or less of the adhesion property improver to 100 parts by weight of the curable resin composition of the first or the second invention. If the addition amount of the adhesion property improver is more than 20 parts by weight to 100 parts by weight of the curable resin composition of the first or the second invention, in the case where the curable resin composition is used, for example, as an adhesive epoxy resin sheet, the strength and the cohesion force of the sheet before curing sometimes become too weak.

The pH adjuster is not particularly limited and for example, acidic fillers such as silica and alkaline fillers such as calcium carbonate can be exemplified. These pH adjusters may be used alone or two or more of them may be used in combination.

The ion scavenger is not particularly limited if it is capable of decreasing the amount of ionic impurities and for example, aluminosilicates, hydrated titanium oxide, hydrated bismuth oxide, zirconium phosphate, titanium phosphate, hydrotalcite, ammonium molybdophosphate, zinc hexacyanate, and organic ion exchange resins and a series of IXE (trade name, produced by Toagosei Co., Ltd.) commercialized as ion scavengers excellent in the properties at high temperature can be exemplified. These ion scavengers may be used alone or two or more of them may be used in combination.

The addition amount of the ion scavenger is not particularly limited, however it is preferable to add 10 parts by weight or less of the ion scavenger to 100 parts by weight of the curable resin composition of the first or the second invention. If the addition amount of the ion scavenger is more than 10 parts by weight to 100 parts by weight of the curable resin composition of the first or the second invention, the curing speed of the curable resin composition is sometimes significantly decreased.

A production method of the curable resin compositions of the first and the second invention is not particularly limited and a desired curable resin composition can be produced by evenly kneading respectively specified amounts of the respectively indispensable components, respectively specified amounts of the respective components allowed to be added optionally, and respectively specified amounts of one or more kinds of additives allowed to be added optionally under conditions of normal or heating temperature and normal, reduced, or increased pressure, or inert gas current by using various kinds of well known kneading apparatus alone or in combination, e.g. a homodispersing apparatus, a multi-purpose mixer, a Bumbury's mixer, a kneader, a two-roll or three-roll extruder, and the like. Additionally, if the curing agent for epoxy resins is a thermosetting type curing agent or a latent agent, the production method can be employed, and on the other hand, if the curing agent for epoxy resins is normal temperature setting type curing agent, addition of the curing agent for epoxy resins is preferable to be immediately before use of the curable resin composition or a final product using the composition.

With respect to the curable resin compositions of the first and the second inventions obtained in the manner, it is preferable that extracted water obtained by extracting an eluting component of the cured products of the curable resin compositions with hot water at 110° C. has pH not lower than 5.0 and lower than 8.5.

If the extracted water obtained by extracting an eluting component of the cured product of the curable resin compositions of the first and the second inventions with hot water at 110° C. has pH either lower than 5.0 or 8.5 or higher, an acidic substance or an alkaline substance flows out in the periphery of the cured product surface to cause corrosion of an electrode metal such as aluminum and copper or cause reaction of chlorine depletion using the acid produced by hydrolysis and the like in the cured product as a catalyst to result in chlorine ion elution and deterioration of reliability.

It is also preferable that the extracted water obtained by extracting an eluting component of the cured product of the curable resin compositions of the first and the second inventions with hot water at 110° C. has an electric conductivity of 100 μS/cm or lower. That the electric conductivity is higher than 100 μS/cm means increase of the electric conductivity in the resins if the cured product is put particularly in wetting condition and therefore, in the case where conductive connection is formed by using the curable resin compositions of the first and the second invention, electric leakage or dielectric breakdown may possibly occur between electrodes.

Further, it is also preferable that the cured product of the curable resin compositions of the first and the second invention has dielectric constant of 3.5 or lower and a dielectric loss tangent of 0.02 or lower. If the dielectric constant is more than 3.5 and dielectric loss tangent is more than 0.02, the transmission property at the presently available high frequency may be worsened.

Uses of the curable resin compositions of the first and the second inventions are not particularly limited and for examples, they may be processed to be adhesive epoxy resin pastes, adhesive epoxy resin sheets, conductive connection pastes, and conductive connection sheets and preferably used for fixing electronic materials. Also, the curable resin compositions may be used as adhesives by finishing them to be like varnish and forming thin films of the varnish on silicon wafers by coating, e.g. spin coating.

Fluxes may be added to the curable resin compositions of the first and the second inventions. The fluxes are preferable to be inactivated fluxes. Since the curable resin compositions contain no filler with a large average particle diameter and therefore can be used practically as non-filler pastes and non-filler sheets and also since they are made to give cured products with pH in a neutral region, they are suitable to be used for flux-containing pastes or flux-containing sheets for conductive connection.

If in pellet form, the curable resin compositions of the first and the second inventions can be used as sealants such as sealants for semiconductor packages, sealants for QFN, and sealants for integral molding type CSP. If the curable resin compositions are practically non-filler pastes, the compositions may be employed for sealing re-wiring circuits on wafers bearing re-wiring and metal posts for external electric connection by directly applying the compositions to the wafer by a screen printing or spin coating method, curing the compositions, and then polishing the cured compositions. Also, the curable resin compositions are directly applied to the wafer by a screen printing method and to be used as overcoating agents on the wafers.

Being formed in a sheet form, the curable resin compositions of the first and the second inventions may be used as adhesive sheets for fixing semiconductor chips.

The adhesive epoxy resin paste of the third invention comprises the curable resin composition of the first or the second invention. The curable resin composition of the first or the second invention originally has an adhesive property, so that the composition can easily be made to be the adhesive epoxy resin paste of the third invention. The adhesive epoxy resin paste of the third invention can easily be obtained by finishing the curable resin composition of the first or the second invention to be like a paste by adding a viscosity adjuster or a thixotropy providing agent, if necessary, at the time of producing the curable resin composition of the first or the second invention.

The interlayer adhesive of the fourth invention, the non-conductive paste of the fifth invention, and the underfill of the sixth invention comprise the adhesive epoxy resin paste of the third invention.

The adhesive epoxy resin sheet of the seventh invention is obtainable by forming the curable resin composition of the first or the second invention in a sheet form.

A method of forming the curable resin composition of the first or the second invention in a sheet form is not particularly limited and for examples, there are an extrusion molding method using an extruder and a solution cast method involving producing a curable resin composition solution by diluting the curable resin composition with a solvent, casing the solution on a separator, and drying the solvent. Between them, since no high temperature process is required, the solution cast method if preferable to be employed.

The adhesive epoxy resin sheet of the seventh invention is preferable to have a storage modulus (G') in the case of heating the adhesive epoxy resin sheet is heated at a temperature rising rate of 45° C./min exceeding $1 \times 10^3$ Pa. If the storage modulus (G') of the adhesive epoxy resin sheet is $1 \times 10^3$ Pa or lower, voids may be formed in the adhesion interface between the adhesive epoxy resin sheet and an adherend at the time of heat curing of the adhesive epoxy resin sheet.

The adhesive epoxy resin sheet of the seventh invention is preferable to have the peak temperature of tan δ based on dynamic viscoelasticity is in a range of −20° C. to 40° C. before curing and 120° C. or higher after curing. The peak temperature is more preferably in a range of 0 to 35° C. before curing and 160° C. or higher after curing. Here, tan δ is a value expressed as the dynamic loss tangent calculated by measuring the dynamic viscoelasticity (measurement frequency: 10 Hz, temperature rising speed: 3° C./min). And, before curing means the state before heat curing of the adhesive epoxy resin sheet by heating the sheet to a prescribed temperature or higher and after curing means the state after heat curing of the adhesive epoxy resin sheet. In addition, the adhesive epoxy resin sheet of the fourth invention is, in general, heat-cured in a temperature range of 20 to 230° C.

Since having the peak temperature of tan δ as described, the adhesive epoxy resin sheet of the seventh invention is flexible in normal temperature range, excellent in the handing property, provided with pressure sensitive adhesive property at normal temperature and therefore capable of sticking objects to be adhered to each other in normal temperature range without hot pressing and giving high adhesion reliability by heat curing (followed by aging) in a heat oven and the like. That is, the adhesive epoxy resin sheet of the seventh invention has the pressure sensitive adhesive property at normal temperature before curing and exhibits excellent physical properties after curing by heating, so that the sheet having the pressure sensitive adhesive property can carry out sticking, positioning, or temporal fixation and can exhibit excellent physical properties such as adhesive force by heating thereafter and provide sufficiently high adhesion reliability as the adhesive sheet.

If the peak temperature of tan δ of the adhesive epoxy resin sheet before curing is lower than −20° C., the cohesion force of the adhesive epoxy resin sheet is insufficient to make the delamination of the sheet from a separator difficult. Further, in the case of producing a conductive connection sheet by adding conductive fine particles to the adhesive epoxy resin sheet, which will be described later, it may occurs that the epoxy resin flows in through holes formed for arranging the conductive fine particles therein. On the contrary, if the peak temperature of tan δ of the adhesive epoxy resin sheet before curing is more than 40° C., in the case of producing a conductive connection sheet by adding conductive fine particles to the adhesive epoxy resin sheet, the pressure sensitive adhesive property of the sheet to the conductive fine particles at normal temperature may become insufficient to make retention of the conductive fine particles difficult.

Further if the peak temperature of tan δ of the adhesive epoxy resin sheet after curing is lower than 120° C., the cured adhesive epoxy resin sheet may be softened in high temperature and high humidity environments typically in the case of a pressure cooker test and the like to deteriorate adhesion reliability.

The adhesive epoxy resin sheet of the seventh invention is preferable to have a linear expansion coefficient of 10 ppm/° C. as a lower limit and 200 ppm/° C. as an upper limit after curing, more preferably 20 ppm/° C. as a lower limit and 150 ppm/° C. as an upper limit, and even more preferably 30 ppm/° C. as a lower limit and 100 ppm/° C. as an upper limit.

If the linear expansion coefficient of the adhesive epoxy resin sheet is lower than 10 ppm/° C., in the case of producing a conductive connection sheet by adding conductive fine particles to the adhesive epoxy resin sheet, the difference of the linear expansion of the adhesive epoxy resin sheet and the conductive fine particles becomes wide and if the conductive connection sheet is subjected to heat cycles and the like, the sheet cannot follow the linear expansion of the conductive fine particles and therefore it becomes difficult to maintain high conduction reliability in some cases and on the contrary, if the linear expansion coefficient of the adhesive epoxy resin sheet is more than 200 ppm/° C., in the case of producing a conductive connection sheet by adding conductive fine particles to the adhesive epoxy resin sheet, the interval of the electrodes on the opposite to each other is so widened to part the conductive fine particles from the electrodes to cause conductive connection failure in some cases when the sheet is subjected to heat cycles and the like.

The non-conductive film of the eighth invention and the die attach film of the ninth invention comprise the adhesive epoxy resin sheet of the seventh invention.

The conductive connection paste of the tenth invention contains the adhesive epoxy resin paste of the third invention and conductive fine particles contained in the epoxy resin paste.

The anisotropic conductive paste of the eleventh invention comprises the conductive connection paste of the tenth invention.

The conductive connection sheet of the twelfth invention comprises the adhesive epoxy resin sheet of the seventh invention and at least a part of the conductive fine particles exposed out of the adhesive epoxy resin sheet.

The conductive connection sheet of the thirteenth invention is obtainable by embedding conductive fine particles smaller than the thickness of the adhesive epoxy resin sheet in the adhesive epoxy resin sheet of the seventh invention.

The conductive fine particles to be used for the conductive connection paste of the tenth invention, the anisotropic conductive paste of the eleventh invention, and the conductive connection sheets of the twelfth and the thirteenth inventions are not particularly limited if they are fine particles having electric conductivity and for example, particles of conductive inorganic materials such as metals and carbon black and conductive polymers, resins of high molecular polymers, non-conductive inorganic materials and non-conductive polymers coated with conductive coating films in the outermost layers by plating, and conductive inorganic materials and conductive polymers coated with conductive coating films in the outermost layers can be exemplified and among them, conductive fine particles obtained by forming conductive coating films on the surfaces of cores (core materials) of high molecular polymers are preferable to be used since they are easy to be formed into spherical form with proper elasticity, flexibility, and shape restoration property and the like. These conductive fine particles may be used alone or two or more of them may be used in combination.

The conductive coating films are not particularly limited, however they are preferable to be of metals. The metals for forming the conductive coating films are not particularly limited and for example, nickel, gold, silver, aluminum, copper, tin, and a solder can be exemplified. The conductive coating films are preferably conductive coating films having gold in the outermost layer in consideration of the contact resistance and conductivity to electrodes and suppression of oxidation deterioration. Further, the conductive coating films are preferable to have a nickel layer to improve the adhesion property of the metals to barrier layers for multi-layer structure formation and cores.

The thickness of the conductive coating films is not particularly limited if it is enough to provide sufficient conduction and coating strength so as to avoid delamination and it is preferably 0.4 µm or thicker, more preferably 1 µm or thicker, and even more preferably 2 µm or thicker. The diameter of the core is not particularly limited if it is enough to prevent losing the properties of the core and it is preferably ⅕ of the diameter of the conductive fine particles or smaller.

The high molecular polymer to be the cores of the conductive fine particles is not particularly limited and for example, thermoplastic resins and thermosetting resins such as amino type resins, e.g. urea resin, and melamine resin; phenol type resins; acrylic resins; ethylene-vinyl acetate copolymers; styrene-butadiene type block copolymers; polyester type resins; alkyd type resins; polyimide type resins; urethane type resins; and epoxy resins; crosslinked resins; and organic-inorganic hydride polymers and among them the crosslinked resins are preferable to be used since they are excellent in the heat resistance. These high molecular polymers may further contain fillers if necessary. These high molecular polymers may be used alone or two or more of them may be used in combination.

The conductive fine particles are not particularly limited, however the particles are preferable to have an average particle diameter, an aspect ratio of the particle diameter, a CV value (coefficient of variation) of the particle diameter, a resistance value, a compaction restoration ratio, a linear expansion coefficient, and a K value in the following respective ranges.

The average particle diameter of the conductive fine particles is preferably in a range of 1 µm as the lower limit and 5 µm in the upper limit in the case where the conductive fine particles are kneaded with the resin. The lower limit is more preferably 2 µm.

In the case where the conductive fine particles are used in the state that the conductive fine particles are exposed out of a sheet, the average particle diameter of the conductive fine particles is preferably in a range of 10 µm as the lower limit and 800 µm in the upper limit although it depends on the thickness of the sheet. If it is smaller than 10 µm, in terms of the precision problem of the smoothness of the electrodes and substrate, the conductive fine particles are scarcely brought into contact with the electrodes to result in probability of electric connection failure and if it is more than 800 µm, the particles become improper for electrodes at a narrow interval to result in short circuit between neighboring electrodes in some cases. The lower limit is more preferably 15 µm and the upper limit is more preferably 300 µm; the lower limit is even more preferably 20 µm and the upper limit is even more preferably 150 µm; and the lower limit is particularly preferable to be 40 µm and the upper limit is particularly preferable to be 80 µm.

The average particle diameter of the conductive fine particles can be measured by observing any optional 100 conductive fine particles with a microscope.

The aspect ratio of the particle diameter of the conductive fine particles is preferably lower than 1.3, more preferably lower than 1.1, and even more preferably lower than 1.05. The aspect ratio of the particle diameter of the conductive fine particles is a value calculated by dividing the average longer diameter of the conductive fine particles by the average shorter diameter.

If the aspect ratio of the particle diameter of the conductive fine particles is 1.3 or higher, the conductive fine particles are uneven and therefore the shorter diameter portions hardly reach the electrodes to cause electric connection failure. In general, since the conductive fine particles have a high aspect ratio of the particle diameter, the conductive fine particles to be used for the invention are preferable to be made spherical by spheroidization treatment by utilizing the surface tension in deformable state.

The CV value (coefficient of variation) of the particle diameter of the conductive fine particles is preferably 5% or lower, more preferably 2% or lower, and even more preferably 1% or lower. The CV value of the particle diameter of the conductive fine particles means a value calculated by dividing the standard deviation of the particle diameter by the average particle diameter and multiplying by 100 according to the following equation: CV value of particle diameter (%)=(standard deviation of the particle diameter/the average particle diameter)×100.

If the CV value of the particle diameter of the conductive fine particles is more than 5%, the particle diameter is uneven and therefore the small conductive fine particles hardly reach the electrodes to cause electric connection failure. In general, since the conductive fine particles have a high CV value of the particle diameter, the conductive fine particles to be used for the invention are preferable to have an even particle diameter by classifying and the like. Particularly, since the fine particles with 200 μm or smaller particle diameter are difficult to be classified, it is preferable to carry out classification by combining sieving classification, air flow classification, and wet classification.

The resistance value of the conductive fine particles is preferably 1Ω or lower, more preferably 0.3Ω or lower, even more preferably 0.05Ω or lower, and particularly preferable to be 0.01Ω or lower, when the average particle diameter of the conductive fine particles is compacted to 10%.

If the resistance value of the conductive fine particles is more than 1Ω, it may possibly become difficult to retain sufficient electric current or to withstand high voltage and it results in inhibition of normal operation of a device in some cases. If the resistance value of the conductive fine particles is 0.05Ω or lower, the effect is considerably improved, for example, even an electric current operable device can be operated while keeping the high conduction reliability.

The compaction restoration ratio of the conductive fine particles is preferably 5% or higher, more preferably 20% or higher, even more preferably 50% or higher, and particularly preferable to be 80% or higher. Here, the compaction restoration ratio of the conductive fine particles means the shape restoration ratio in the 10% compaction deformation state in 20° C. ambient atmosphere and measured according to the method described in Japanese Kokoku Publication Hei-7-95165 by compacting the conductive fine particles with a smooth end face of a cylindrical pole with 50 μm diameter made of diamond in conditions of 0.28 mN/s compaction speed, 1.0 mN origin load value and 10 mN reverse load value using a micro compaction tester (trade name PCT-200 manufactured by Shimadzu Corp.) and measuring the % ratio of the displacement difference to the reverse point.

If the compaction restoration ratio of the conductive fine particles is lower than 5%, when the interval of electrodes on the opposite to each other is widened for a second owing to impact application and the like, the particles cannot follow the instantaneous change to make the electric connection instable for a second in some cases.

The linear expansion coefficient of the conductive fine particles is preferably 10 ppm/° C. as the lower limit and 200 ppm/° C. as the upper limit. The lower limit and the upper limit are more preferably 20 ppm/° C. and 150 ppm/° C., respectively, and even more preferably 30 ppm/° C. and 100 ppm/° C., respectively. The linear expansion coefficient of the conductive fine particles can be measured by a conventionally known method.

If the linear expansion coefficient of the conductive fine particles is lower than 10 ppm/° C., in the case where the conductive connection sheet of the sixth or the seventh invention is formed by adding the conductive fine particles to the adhesive epoxy resin sheet of the fourth invention, the difference of the linear expansion between the conductive fine particles and the adhesive epoxy resin sheet becomes wide and therefore if the adhesive epoxy resin sheet is subjected to heat cycles and the like, the conductive fine particles are hard to follow the elongation of the sheet to make the electric connection instable in some cases and on the contrary, if the linear expansion coefficient of the conductive fine particles is more than 200 ppm/° C., in the case where the conductive connection sheet is bonded to a substrate by pressure sensitive bonding, the interval of electrodes is too widened in the case where the sheet is subjected to heat cycles and the like and consequently, the adhesion portions by pressure sensitive bonding are broken and the stress is concentrated to the connection parts of the electrodes to result in electric connection failure in some cases.

The K value of the conductive fine particles is preferably 400 N/mm$^2$ as the lower limit and 15,000 N/mm$^2$ as the upper limit and the lower limit and the upper limit are more preferably 1,000 N/mm$^2$ and 10,000 N/mm$^2$, respectively; even more preferably 2,000 N/mm$^2$ and 8,000 N/mm$^2$, respectively; and particularly preferable to be 3,000 N/mm$^2$ and 6,000 N/mm$^2$, respectively. The K value of the conductive fine particles is defined as $(3/\sqrt{2}) \times F \times S^{-3/2} \times R^{-1/2}$ (unit N/mm$^2$) as described in Japanese Kokoku Publication Hei-7-95165, value universally and quantitatively expressing the hardness of spherical body. Practically, the value can be calculated according to the method described in the Publication by compacting the conductive fine particles with a smooth end face of a cylindrical pole with 50 μm diameter made of diamond in conditions of 0.27 g/s compaction hardness and the maximum testing load 10 g using a micro compaction tester (trade name PCT-200 manufactured by Shimadzu Corp.). Here, F denotes the load value (N) at the time of 10% compaction deformation; S denotes the compaction displacement (mm) at the time of 10% compaction deformation; and R denotes the radius (mm).

If the K value of the conductive fine particles is lower than 400 N/mm$^2$, since the conductive fine particles cannot sufficiently be meshed between electrodes on the opposite to each other, the electric connection may not be formed in the case where the electrode surface is oxidized or the contact resistance is so increased as to lower the conduction reliability in some cases and on the contrary, if the K value of the conductive fine particles is more than 15,000 N/mm$^2$, excess pressure is locally applied to the electrodes on the opposite to each other in the case where the conductive fine particles are sandwiched between the electrode to result in possible break of a device or the gap between the electrodes is determined only by the conductive fine particles with a large particle diameter and thus the conductive fine particles with a small particle diameter do not reach the electrode to cause electric connection failure in some cases.

The conductive connection paste of the tenth invention can be produced by adding a prescribed amount of the conductive fine particles in the adhesive epoxy resin paste of the third invention and evenly kneading them.

The conductive connection sheets of the twelfth and the thirteenth inventions can be produced by adding a prescribed amount of the conductive fine particles to the adhesive epoxy resin sheet of the seventh invention and arranging or embedding the particles in the sheet.

The thickness of the adhesive epoxy resin sheet to be used for the conductive connection sheets is preferably ½ to 2 times, more preferably ⅔ to 1.5 times, even more preferably ¾ to 1.3 times, and particularly preferable to be ⅘ to 1.2 times, as large as the average particle diameter of the conductive fine particles.

In the case where the conductive fine particles are exposed out of the sheet with respect to the conductive connection sheet, if the thickness of the adhesive epoxy resin sheet is thinner than ½ times as large as the average particle diameter of the conductive fine particles, it becomes difficult for the adhesive epoxy resin sheet to support an electrode substrate and on the other hand, if thickness of the adhesive epoxy resin sheet is thicker than 2 times as large as the average particle diameter of the conductive fine particles, the conductive fine particles do not reach the electrodes to result in possible electric connection failure. Particularly, if there are bumps on devices and electrodes of a substrate, the thickness of the adhesive epoxy resin sheet is preferably at least 1 time as large as the average particle diameter of the conductive fine particles and on the other hand, if there is no bump on devices and electrodes of a substrate, the thickness of the adhesive epoxy resin sheet is preferably at highest 1 time as large as the average particle diameter of the conductive fine particles.

It is preferable that through holes for arranging the conductive fine particles are formed in the adhesive epoxy resin sheet to be used for producing the conductive connection sheets. The positions to form the through holes are not particularly limited and may properly be selected corresponding to a substrate or a chip, which is an object to be connected electrically and optionally formed at the same positions of the electrodes of the substrate to be set on the opposite for electric connection.

The through holes are not particularly limited, however the holes are preferable to have an average hole diameter, an aspect ratio of the hole diameter, and a CV value of the hole diameter within the following respective ranges.

The average hole diameter of the through holes is preferably ½ to 2 times, more preferably ⅔ to 1.3 times, even more preferably ⅘ to 1.2 times, and particularly preferable to be 9/10 to 1.1 times as large as the average particle diameter of the conductive fine particles. If the average hole diameter of the through holes is less than ½ times or more than 2 times as large as the average particle diameter of the conductive fine particles, the embedded conductive fine particles are easy to be shifted from the through holes in some cases.

The aspect ratio of the hole diameter of the through holes is preferably less than 2, more preferably 1.5 or less, even more preferably 1.3 or less, and particularly preferable to be 1.1 or less. If the aspect ratio the hole diameter of the through holes is more than 2, the arranged conductive fine particles are easily shifted from the through holes in some cases. Additionally, the aspect ratio the hole diameter of the through holes is a value calculated by dividing the average longer diameter of the hole diameter by the average shorter diameter thereof.

The CV value of the hole diameter of the through holes is preferably 10% or lower, more preferably 5% or lower, even more preferably 2% or lower, and particularly preferable to be 1% or lower. If the CV value of the hole diameter of the through holes is higher than 10%, the hole diameter becomes uneven and the arranged conductive fine particles are sometimes easily shifted from the through holes. The CV value of the hole diameter of the through holes is a value calculated by dividing the standard deviation of the hole diameter by the average diameter and multiplying by 100 according to the following equation. CV value of hole diameter (%)=(standard deviation of hole diameter/average hole diameter)×100.

In the case where the through holes are formed in the adhesive epoxy resin sheet to be used for producing the conductive connection sheet and the conductive fine particles are arranged in the through holes, if the adhesive epoxy resin sheet itself is provided with pressure sensitive adhesive property, owing to the pressure sensitive adhesive property in the surrounding of the through holes, the sheet is provided with the property of adhering to the conductive fine particles and highly reliably retains the conductive fine particles around room temperature.

As a method of arranging the conductive fine particles in the through holes formed in the adhesive epoxy resin sheet, a method of attracting the conductive fine particles through the through holes and a method of pressurizing the conductive fine particles on the through holes can be exemplified.

The conductive connection sheet of the twelfth invention is obtainable by adding the conductive fine particles in the adhesive epoxy resin sheet of the seventh invention and that is, a large number of conductive fine particles are arranged at any optional positions in the adhesive epoxy resin sheet of the seventh invention and at least partially exposed out of the adhesive epoxy resin sheet.

Being formed in the structure, the conductive connection sheet is capable of forming electric connection with high reliability within a short time without causing electric leakage between neighboring electrodes in the case where fine electrodes on the opposite to each other are to be electrically connected.

With respect to the positions where the conductive fine particles are arranged, the conductive fine particles may be arranged so that the conductive fine particles are at least partially exposed only in one face of the adhesive epoxy resin sheet or the conductive fine particles are at least partially exposed in both faces of the adhesive epoxy resin sheet.

The conductive connection sheet of the thirteenth invention is obtainable by embedding conductive fine particles smaller than the thickness of an adhesive epoxy resin sheet of the seventh invention in the sheet. In the conductive connection sheet of the seventh invention, the conductive fine particles smaller than the thickness of the sheet may be at least partially exposed in one or both faces of the adhesive epoxy resin sheet or may not be exposed.

In the case where no through hole is formed in the adhesive epoxy resin sheet, the conductive fine particles smaller than the thickness of the adhesive epoxy resin sheet may be embedded by pressurizing the conductive fine particles on the adhesive epoxy resin sheet. In this case, if the adhesive epoxy resin sheet itself is provided with the pressure sensitive adhesive property, the conductive fine particles are embedded while being stably held owing to the pressure sensitive adhesive property. Additionally, in the case where the pressure sensitive adhesive property of the adhesive epoxy resin sheet is weak, the pressure sensitive adhesive property of the adhesive epoxy resin sheet may be increased by carrying out heating to the extent that the adhesive epoxy resin sheet is not cured. The embedded conductive fine particles are preferable to have the center of gravity in the inside of the adhesive epoxy resin sheet. Accordingly, the conductive fine particles can be embedded in stable state.

The anisotropic conductive film of the fourteenth invention comprises the conductive connection sheet of the thirteenth invention.

The conductive connection sheet of the fifteenth invention comprises a pressure sensitive adhesive resin sheet comprising a pressure sensitive resin composition containing a resin provided with a pressure sensitive adhesive property by addition of a plasticizer and a naphthalene type epoxy resin in liquid phase at normal temperature and conductive fine particles, wherein the pressure sensitive adhesive resin sheet has a peak temperature of tan δ based on dynamic viscoelasticity in a range of −20° C. to 40° C. before curing and 120° C. or higher after curing and the conductive fine particles are arranged at any positions of the pressure sensitive adhesive resin sheet and at least partially exposed out of the pressure sensitive adhesive resin sheet.

The resin provided with a pressure sensitive adhesive property by addition of a plasticizer is not particularly limited and for example, vinyl acetate type resins, ethylene-vinyl acetate copolymers, acrylic resins, polyvinyl acetal type resins such as polyvinyl butyral resin, styrene type resins, saturated polyester type resins, thermoplastic urethane type resins, polyamide type resins, thermoplastic polyimide type resins, ketone type resins, norbornene type resins, and styrene-butadiene type block copolymers. These resins are preferably high molecular polymers having a relatively high glass transition temperature since they have high heat resistance and are to be provided with the pressure sensitive adhesive property by addition of the plasticizer. These resins may be used alone or two or more of them may be used in combination.

As the plasticizer to be added to the pressure sensitive adhesive resin composition, a naphthalene type epoxy resin in liquid state at normal temperature can be used. The naphthalene type epoxy resin means the epoxy resin having the epoxy group-containing naphthalene skeleton. Since the naphthalene type epoxy resin has the rigid naphthalene skeleton, the conductive connection sheet of the eighth invention is provided with a high shape-retaining property after curing even in high temperature and high humidity environments.

The naphthalene type epoxy resin generally contains isomers and therefore has a melting point of normal temperature or lower, so that the conductive connection sheet of the eighth invention can maintain the pressure sensitive adhesive property even if being handled in low temperature. That is, in the case where the high molecular polymer having a relatively high glass transition temperature is to be provided with the pressure sensitive adhesive property, use of the naphthalene type epoxy resin in liquid state at normal temperature causes excellent plasticizing effect and gives a pressure sensitive adhesive resin sheet which can satisfy both of the pressure sensitive adhesive property to the conductive fine particles and the shape-retaining property in high temperature and high humidity environments even in the case of handing at low temperature and accordingly gives the conductive connection sheet.

The naphthalene type epoxy resin in liquid state at normal temperature is not particularly limited and for example, 1-glycidylnaphthalene, 2-glycidylnaphthalene, 1,2-diglycidylnaphthalene, 1,5-diglycidylnaphthalene, 1,6-diglycidylnaphthalene, 1,7-diglycidylnaphthalene, 2,7-diglycidylnaphthalene, triglycidylnaphthalene, and 1,2,5,6-tetraglycidylnaphthalene can be exemplified. These naphthalene type epoxy resins can be used alone or two or more of them may be used in combination.

The number of the epoxy groups to be contained in the naphthalene type epoxy resins in liquid state at normal temperature is not particularly limited and it is preferably one or more in average per one molecule and more preferably two or more in average per one molecule.

The pressure sensitive adhesive resin composition is preferable to contain a curing agent for epoxy resins for curing the naphthalene type epoxy resin in liquid state at normal temperature.

The curing agent for epoxy resins is not particularly limited and may be the same curing agent as that to be added as an indispensable component to the curable resin composition of the first or the second invention and for example, acid anhydride type curing agents such as trialkyltetrahydrophthalic anhydride; phenol type curing agents; amine type curing agents; latent curing agents such as dicyandiamide; and cationic catalytic type curing agents can be exemplified. Among the curing agents for epoxy resins, heat curable type curing agents in liquid state at normal temperature and the latent curing agents such as dicyandiamide which are polyfunctional and effective even by addition of a small amount in terms of equivalent are preferable to be used. These curing agents for epoxy resins may be used alone or two or more of them may be used in combination.

Further, in the pressure sensitive adhesive composition, to adjust the curing speed and physical properties of cured products and the like, a curing accelerator may be used in combination of the curing agent for epoxy resins.

The curing accelerator is not particularly limited and may be the same curing accelerator as that to be used in combination in the curable resin compositions of the first and the second inventions and for example, imidazole type curing accelerators and tertiary amine type curing accelerators can be exemplified and among them, the imidazole type curing accelerators are preferably used since it is made easy to control the reaction system for adjusting the curing speed and physical properties of cured products and the like. These curing accelerators may be used alone and two or more of them may be used in combination.

The pressure sensitive adhesive composition may also contain, if necessary, a high molecular polymer which is not provided with the pressure sensitive adhesive property even by addition of a plasticizer (a naphthalene type epoxy resin) as well as an epoxy resin such as a dicyclopentadiene type epoxy resin other than the naphthalene type epoxy resin and an epoxy group-containing compound.

Further, the pressure sensitive adhesive composition may also contain, if necessary, one or more kinds of various additives such as an adhesion property improver, a pH adjuster, an ion scavenger, a viscosity adjuster, a thixotropy providing agent, an antioxidant, a heat stabilizer, a photo-stabilizer, a UV absorbent, a coloring agent, a dehydrating agent, a flame retardant, an antistatic agent, an anti-mold agent, a preserver, and a solvent.

A method of producing a pressure sensitive adhesive sheet by forming the pressure sensitive adhesive resin composition into a sheet shape is not particularly limited and for examples, there are an extrusion molding method using an extruder and a solution cast method involving producing a pressure sensitive adhesive resin composition solution by diluting the pressure sensitive adhesive resin composition with a solvent, casing the solution on a separator, and drying the solvent. Between them, since no high temperature process is required, the solution cast method if preferable to be employed.

The pressure sensitive adhesive resin sheet thus obtained is required to have a peak temperature of tan $\delta$, a value expressed as the dynamic loss tangent calculated by measuring the dynamic viscoelasticity (measurement frequency: 10 Hz, temperature rising speed: 3° C./min), in a range of −20° C. to 40° C. before curing and 120° C. or higher after curing and preferably in a range of 0 to 35° C. before curing and 160° C. or higher after curing.

Since the pressure sensitive adhesive resin sheet has the peak temperature of tan $\delta$ as described, the conductive connection sheet of the fifteenth invention produced from the pressure sensitive adhesive resin sheet is flexible in normal temperature range, excellent in the handing property, provided with pressure sensitive adhesive property at normal temperature and therefore capable of sticking objects to be adhered to each other in normal temperature range without hot pressing and giving high adhesion reliability and conduction reliability by heat curing (followed by aging) in a heat oven and the like. That is, the conductive connection sheet of the fifteenth invention produced from the pressure sensitive adhesive resin sheet has the pressure sensitive adhesive property at normal temperature before curing and exhibits excellent physical properties after curing by heating, so that the sheet having the pressure sensitive adhesive property can carry out sticking, positioning, or temporal fixation and can exhibit excellent physical properties such as excellent adhesive force and excellent conduction by heating thereafter and provide sufficiently high adhesion reliability and conduction reliability as the conductive connection sheet.

If the peak temperature of tan δ of the pressure sensitive adhesive resin sheet before curing is lower than −20° C., the cohesion force of the pressure sensitive adhesive resin sheet is insufficient, so that it could be difficult to separate the conductive connection sheet of the fifteenth invention from a separator or the pressure sensitive adhesive resin composition flows in the through holes formed for arranging the conductive fine particles in the pressure sensitive adhesive sheet and fill the through holes. On the contrary, if the peak temperature of tan δ of the pressure sensitive adhesive resin sheet before curing is more than 40° C., in the case of producing a conductive connection sheet by adding conductive fine particles to the pressure sensitive adhesive resin sheet, the pressure sensitive adhesive property of the sheet to the conductive fine particles at normal temperature becomes insufficient to make retention of the conductive fine particles difficult.

Further, the pressure sensitive adhesive resin sheet is preferable to have an elongation percentage of 5% or lower after the sheet is subjected to a pressure cooker test carried out in conditions of a temperature of 120° C. and a humidity of 85% RH for 12 hours.

If the elongation percentage of the pressure sensitive adhesive resin sheet after curing is more than 5% after the sheet is subjected to the pressure cooker test, the adhesion reliability and conduction reliability of the conductive connection sheet of the fifteenth invention produced from the pressure sensitive adhesive resin sheet may possibly be insufficient.

The conductive fine particles to be used for the conductive connection sheet of the fifteenth invention are not particularly limited and may be the same conductive fine particles to be added to the conductive connection paste of the tenth invention, the anisotropic conductive paste of the eleventh invention, and the conductive connection sheets of the twelfth and the thirteenth inventions and for example, particles of conductive inorganic materials such as metals and carbon black and conductive polymers, resins of high molecular polymers, non-conductive inorganic materials and non-conductive polymers coated with conductive coating films in the outermost layers by plating, and conductive inorganic materials and conductive polymers coated with conductive coating films in the outermost layers can be exemplified and among them, conductive fine particles obtained by forming conductive coating films on the surfaces of cores (core materials) of high molecular polymers are preferable to be used since they are easy to be formed into spherical form with proper elasticity, flexibility, and shape restoration property. These conductive fine particles may be used alone or two or more of them may be used in combination.

The conductive connection sheet of the fifteenth invention comprises the pressure sensitive adhesive resin sheet and the conductive fine particles contained in the resin sheet. That is, a large number of conductive fine particles are arranged at any optional positions in the pressure sensitive adhesive resin sheet and at least partially exposed out of the pressure sensitive adhesive resin sheet.

Being formed in the structure, the conductive connection sheet is capable of forming electric connection easily with high reliability within a short time without causing electric leakage between neighboring electrodes in the case where fine electrodes on the opposite to each other are to be electrically connected.

With respect to the positions where the conductive fine particles are arranged, the conductive fine particles may be arranged so that the conductive fine particles are at least partially exposed only in one face of the pressure sensitive adhesive resin sheet or the conductive fine particles are at least partially exposed in both faces of the pressure sensitive adhesive resin sheet.

The method of producing the conductive connection sheet by arranging a large number of the conductive fine particles at any optional positions in the pressure sensitive adhesive resin sheet may be the same method of the case of producing the conductive connection sheet of the twelfth invention.

Since the adhesive epoxy resin paste of the third invention and the conductive connection paste of the tenth invention (hereinafter, referred to as paste(s) for short) are paste state differing from sheet ones, it is no need for the pastes to be previously cut or processed corresponding to the sizes of IC chips and electronic devices and the like and no apparatus for a sticking work is needed, so that the pastes are excellent in multi-type, small-lot production.

Further, since the pastes are paste state differing from sheet ones, they are free from positioning failure at the time of sticking and void formation even for a substrate having significant unevenness with a wiring part or a substrate having significant unevenness in the parts other than the wiring part. Further, in the case of sheet ones, there is a risk that the sheets are extended or cut at the time of sticking the sheets and on the other hand, owing to the paste state, the pastes are also free from such a risk. Accordingly, the pastes are usable more advantageously for IC chips and electronic devices with small sizes and substrates having significant unevenness than sheet ones.

The adhesive epoxy resin paste of the third invention and the conductive connection paste of the tenth invention may be diluted with a solvent or solvent-free type as long as the pastes are adjusted to have proper viscosity to be applied by a coating apparatus such as a dispenser. Further, the pastes may be applied to IC chips and electronic devices or to substrates. That is, they may be applied to those which are easy to be applied. In general, it is preferable to previously apply the pastes to substrates since the application amount can be adjusted easily.

In the case where the pastes are diluted with a solvent, the pastes may be used in a manner that they are applied to either one of objects to be adhered and aged at low temperature so as to retard curing, evaporate the solvent, and thus convert them to be B-stage from the paste state and the objects are bonded to each other by flip chip connection and the like after positioning of the IC chips and electronic devices. Even in the case where the pastes are solvent-free type, it is also possible to carry out flip chip connection after positioning of the IC chips and electronic devices.

The pastes may be applied partially only to the parts to be bonded by a dispenser, a roller, or a stumper. To improve the adhesion reliability and the conduction reliability, the pastes may be fluidized by heating so as to bury the unevenness of a substrate with the heat at the time of flip chip connection.

Use of the adhesive epoxy resin paste of the third invention and the conductive connection paste of the tenth invention is not particularly limited and the pastes are preferably used for adhesion and conductive connection of circuit substrates and fixation of electronic materials such as electric connection of a bump-shaped projected electrode of an electronic part and an electrode of a counterpart object, and the like.

On the other hand, differing from paste-like ones, since the adhesive epoxy resin sheet of the seventh invention and the conductive connection sheets of the twelfth, the thirteenth, and the fifteenth inventions have sheet form, it is required for the sheets to be previously cut or processed corresponding to the sizes of IC chips and electronic devices and the like or an apparatus for a sticking work is required, however high speed production in production line is possible and therefore, the sheets are excellent in small-type, large-quantity production.

Use of the conductive connection sheets of the twelfth, the thirteenth, and the fifteenth inventions is not particularly limited and for example, in electronic products such as liquid crystal displays, personal computers, and mobile communication appliances, the sheets may preferably be used for electrically connecting fine electrodes set on the opposite to each other among methods of electrically connecting small size parts such as semiconductor devices to substrates or a substrate to another substrate. As practically produced products, there are memory cards, IC cards and the like. Also, the sheets may preferably be used for connecting a glass surface and an electrode face of an electric connection circuit set on the opposite to each other among methods of forming electric connection circuits on glass surfaces of light parts of automobiles in the circuit in glass substrate surface production process. In such a manner, the sheets can provide electronic component joined bodies. The conductive connection sheets may be used for a single layer substrate and also to a substrate comprising a plurality of layers using the conductive fine particles as an electric connection material between an upper and a lower layers.

The flip chip tape of the sixteenth invention comprises a conductive connection sheet of the twelfth or the fifteenth invention.

The conductive connection sheets of the twelfth, the thirteenth, and the fifteenth inventions are particularly preferably used for bear chip joining. In general, in the case of using a flip chip at the time of joining bear chips, bumps are needed and in the case where the conductive connection sheets are used, the conductive fine particles work as the bumps and therefore, connection is made possible without using the bumps. Accordingly, complicated process in the bump formation can advantageously be omitted. If the conductive fine particles have preferable K value and CV value as described above, even in the case of electrodes susceptive of oxidation such as aluminum electrodes, electric connection of the electrodes can be formed by breaking the oxide films.

As a connection method of the conductive connection sheets of the twelfth, the thirteenth, and the fifteenth inventions with the substrates and bump-free chips, the following method can be exemplified. A conductive connection sheet is put on a substrate or chip bearing an electrode on the surface in a manner that the conductive fine particles are placed on the electrode; another substrate or chip bearing an electrode is put on the sheet in a manner that the electrodes are conformed to each other. In such a state, the substrates or chips are connected through the conductive connection sheet by heating or pressure application. Additionally, for the heating or pressure application, a pressing apparatus or a bonding machine equipped with a heater is preferably employed.

With respect to the bonding conditions, it is preferable to carry out heating after the electric connection is reliably formed, that is, the electrodes and the conductive fine particles are reliably brought into contact with each other. If it is skipped, resin is fluidized by the heat in the state that the electrodes and the conductive fine particles are not yet sufficiently brought into contact with each other and consequently, the resin flows between the electrodes and the conductive fine particles to lead to the electric connection failure. On the other hand, since no force to press the conductive fine particles exists, the conductive fine particles move from the electrode positions along with the flow of the resin to make the electric connection insecure. Practically, at first a high pressure is applied under no heating condition and after it is confirmed that the electrodes are brought into contact with each other by monitoring the resistance value, the pressure is lowered to low enough to avoid cracking of the conductive fine particles and successively heating is carried out to form highly reliably electric connection without transfer of the conductive fine particles along with the flow of the resin by the friction force with the electrodes and without meshing of the resin between the electrodes and the conductive fine particles. Accordingly, the pressurizing process involves two steps from a high pressure to a low pressure.

At the time of increasing the temperature sharply at once by a ceramic heater, voids may be formed in the resin or in the adhesion interface. They are attributed to foaming of evaporated substances such as water caused at high temperature (around 200° C.) and lead to adhesion failure. To prevent such phenomenon, there is a method of suppressing the substances to be evaporated in the resin. However, even if the substances to be evaporated in the resin are suppressed as much as possible, substances to be evaporated from adherend cause foaming in the case where an organic substrate is used as an adherend. Therefore, it is supposed that the elastic modulus of the resin is kept at a prescribed elastic modulus or higher at the time of heating so as to suppress the foaming phenomenon itself.

As a method based on such an idea, there is a commonly employed technique of conversion to B-stage (semi-cured). Accordingly, the fluidity of the resin is suppressed and at the same time the foaming can be suppressed. However, this technique makes the resin hard to flow to a gap and consequently causes an adverse effect on the adhesion property, particularly to moisture resistant adhesion property of the interface where water unevenly tends to exist. Consequently, it cannot be said that the technique of conversion to B-stage is a preferable method in terms of the total balance.

There is another technique of keeping the elastic modulus of the resin in a certain level or higher without deteriorating the fluidity so much. For the technique, fine inorganic fillers such as silica (particle diameter 1 μm or smaller, in nano-order) commonly used as a tackifier are preferably used. Particularly, it has been known that the void formation can be suppressed by increasing the elastic modulus without employing the technique of conversion to B-stage. The above description is of a conductive connection sheet in which the conductive fine particles are positioned optionally at fixed points, however even the conductive connection sheet in which the conductive fine particles are embedded can be used as a conductive connection material in the same manner.

In a conductive connection structure body obtained by forming connection using a conductive connection sheet of the twelfth, the thirteenth, or the fifteenth inventions, the surrounding of the sheet may be sealed so as to avoid a trouble by penetration of water and the like in the end faces of the connection of the sheet. A sealant to be used for the sealing is not particularly limited and for example, epoxy resin, silicone-resin, phenol resin, polyimide resin, and inorganic material can be exemplified and preferably used.

The electronic component joined body of the seventeenth invention comprises a bump-shaped projected electrode of an electronic part and another electrode joined to each other in electrically connected state by the curable resin composition of the first or the second invention, the adhesive epoxy resin paste of the third invention, the interlayer adhesive of the fourth invention, the non-conductive paste of the fifth invention, the underfill of the sixth invention, the adhesive epoxy resin sheet of the seventh invention, the non-conductive film of the eighth invention, the die attach film of the ninth invention, the conductive connection paste of the tenth invention, the anisotropic conductive paste of the eleventh invention, the conductive connection sheet of the twelfth, thirteenth, or fifteenth invention, the anisotropic conductive film of fourteenth invention, or the flip chip tape of the sixteenth invention.

The electronic component joined body of the eighteenth invention comprises at least one kind circuit substrate selected from a group consisting of a metal lead frame, a ceramic substrate, a resin substrate, a silicon substrate, a compound semiconductor substrate, and a glass substrate and bonded by the curable resin composition of the first or the second invention, the adhesive epoxy resin paste of the third invention, the interlayer adhesive of the fourth invention, the non-conductive paste of the fifth invention, the underfill of the sixth invention, the adhesive epoxy resin sheet of the seventh invention, the non-conductive film of the eighth invention, the die attach film of the ninth invention, the conductive connection paste of the tenth invention, the anisotropic conductive paste of the eleventh invention, the conductive connection sheet of the twelfth, thirteenth, or fifteenth invention, the anisotropic conductive film of fourteenth invention, or the flip chip tape of the sixteenth invention.

The resin substrate is preferably a glass epoxy substrate, a bismaleimidetriazine substrate, or a polyimide substrate.

Since the curable resin composition of the first invention contains an epoxy resin, a solid polymer having a functional group to react with the epoxy group and a curing agent for an epoxy resin and no phase separation structure is observed in a matrix of the resin when the cured product of the composition is dyed with a heavy metal and observed with a transmission electron microscope, the curable resin composition is excellent in mechanical strength, heat resistance, moisture resistance, flexibility, resistance to thermal cycles, resistance to solder reflow, dimensional stability, and the like after curing and provides high adhesion reliability and conduction reliability in the case of use as a conductive material.

Since the curable resin composition of the second invention contains an epoxy resin composition obtainable by mixing a dicyclopentadiene type epoxy resin, a naphthalene epoxy resin, and a curing agent for epoxy resins and rubber particles having a core-shell structure of which the core has a glass transition temperature of 20° C. or lower and the shell has a glass transition temperature of 40° C. or higher, the curable resin composition is excellent in mechanical strength, heat resistance, moisture resistance, flexibility, resistance to thermal cycles, resistance to solder reflow, dimensional stability, and the like after curing and provides high adhesion reliability and conduction reliability in the case of use as a conductive material.

Since the adhesive epoxy resin paste of the third invention and the adhesive epoxy resin sheet of the seventh invention comprise the curable resin composition of the first or second invention, the pastes are excellent in mechanical strength, heat resistance, moisture resistance, flexibility, resistance to thermal cycles, resistance to solder reflow, dimensional stability, and the like after curing and provide high adhesion reliability and conduction reliability in the case of use as a conductive material.

Since the interlayer adhesive agent of the fourth invention, the non-conductive paste of the fifth invention, and the underfill of the sixth invention comprise the adhesive epoxy resin paste of the third invention; the non-conductive film of the eighth invention and the die attach film of the ninth invention comprise the adhesive epoxy resin sheet of the seventh invention, they are excellent in mechanical strength, heat resistance, moisture resistance, flexibility, resistance to thermal cycles, resistance to solder reflow, dimensional stability, and the like after curing and provide high adhesion reliability and conduction reliability in the case of use as a conductive material.

Since the conductive connection paste of the tenth invention comprises the adhesive epoxy resin paste of the third invention and conductive fine particles in the adhesive epoxy resin paste of the third invention, and the conductive connection sheet of the twelfth of thirteenth invention comprises the adhesive epoxy resin paste of the seventh invention and the conductive fine particles arranged or embedded in the adhesive epoxy resin sheet of the seventh invention, they are all excellent in mechanical strength, heat resistance, moisture resistance, flexibility, resistance to thermal cycles, resistance to solder reflow, dimensional stability, and the like after curing and provide high adhesion reliability and conduction reliability.

Since the anisotropic conductive paste of the eleventh invention comprises the conductive connection paste of the tenth invention, the paste is excellent in mechanical strength, heat resistance, moisture resistance, flexibility, resistance to thermal cycles, resistance to solder reflow, dimensional stability, and the like after curing and provides high adhesion reliability and conduction reliability.

Since the anisotropic conductive film of fourteenth invention comprises the conductive connection sheet of the thirteenth invention, the film is excellent in mechanical strength, heat resistance, moisture resistance, flexibility, resistance to thermal cycles, resistance to solder reflow, dimensional stability, and the like after curing and provides high adhesion reliability and conduction reliability.

Since the conductive connection sheet of the fifteenth invention comprises a pressure sensitive adhesive resin sheet comprising a pressure sensitive resin composition containing a resin provided with a pressure sensitive adhesive property by addition of a plasticizer and a naphthalene type epoxy resin in liquid phase at normal temperature and conductive fine particles, wherein the pressure sensitive adhesive resin sheet has a peak temperature of tan δ based on dynamic viscoelasticity in a range of −20° C. to 40° C. before curing and 120° C. or higher after curing and the conductive fine particles are arranged at any positions of the pressure sensitive adhesive resin sheet, the sheet is excellent in mechanical strength, heat resistance, moisture resistance, flexibility, resistance to thermal cycles, resistance to solder reflow, dimensional stability, and the like after curing and provides high adhesion reliability and conduction reliability.

Since the flip chip tape of the sixteenth invention comprises a conductive connection sheet of the twelfth or the fifteenth invention, the tape is excellent in mechanical strength, heat resistance, moisture resistance, flexibility, resistance to thermal cycles, resistance to solder reflow, dimensional stability, and the like after curing and provides high adhesion reliability and conduction reliability.

Since the electronic component joined body of the seventeenth or eighteenth invention is produced by using the curable resin composition of the first or the second invention, the adhesive epoxy resin paste of the third invention, the interlayer adhesive of the fourth invention, the non-conductive paste of the fifth invention, the underfill of the sixth invention, the adhesive epoxy resin sheet of the seventh invention, the non-conductive film of the eighth invention, the die attach film of the ninth invention, the conductive connection paste of the tenth invention, the anisotropic conductive paste of the eleventh invention, the conductive connection sheet of the twelfth, thirteenth, or fifteenth invention, the anisotropic conductive film of fourteenth invention, or the flip chip tape of the sixteenth invention, it is provided with high adhesion reliability and conduction reliability.

BEST MODES FOR CARRYING OUT THE INVENTION

Hereinafter, the invention will be described more in detail by way of examples, however, the invention will not be limited to these examples.

In the examples, the following raw materials were used unless otherwise specified.

1. Epoxy Resin (1) Dicyclopentadiene type solid epoxy resin (trade name: EXA-7200 HH, manufactured by Dainippon Ink and Chemicals, Inc.)

(2) Naphthalene type liquid-state epoxy resin (trade name: HP-4032D, manufactured by Dainippon Ink and Chemicals, Inc.)

(3) Bisphenol A type liquid-state epoxy resin (trade name: EP828, manufactured by Japan Epoxy Resin Co., Ltd.)

2. Epoxy Group-Containing Polymer (1) Epoxy group-containing acrylic resin-a (trade name: Marproof G-2050 M; suspension polymerization method; epoxy equivalent: 340; weight-average molecular weight: 200,000; glass transition temperature: 80° C.; manufactured by Nippon Oil & Fats Co., Ltd.)

(2) Epoxy group-containing acrylic resin-b (trade name: Blemmer CP-15; suspension polymerization method; epoxy equivalent: 500; weight-average molecular weight: 10,000; glass transition temperature: 80° C.; manufactured by Nippon Oil & Fats Co., Ltd.)

(3) Epoxy group-containing acrylic rubber-c (produced by solution polymerization method of ethyl acrylate 99 parts by weight and glycidyl methacrylate 1 part by weight in ethyl acetate by thermal radical method; epoxy equivalent: 8,000; weight-average molecular weight: 200,000; glass transition temperature: 10° C.)

(4) Epoxy group-containing acrylic rubber-d (trade name: Nippol AR-42W; manufactured by Nippon Zeon Co., Ltd.)

3. High Molecular Weight Polymer (1) Polyvinyl butyral resin (trade name: BX-5Z; manufactured by Sekisui Chemical Co., Ltd.)

4. Curing Agent for Epoxy Resin (1) Trialkyltetrahydrophthalic anhydride (trade name: YH-307; manufactured by Japan Epoxy Resin Co., Ltd.)

(2) Dicyandiamide (trade name: EH-3636AS; manufactured by Asahi Denka Co., LTD.)

(3) Guanidine compound (trade name: DX 147; manufactured by Japan Epoxy Resin Co., Ltd.)

5. Curing Accelerator (1) Isocyanuric acid-modified solid dispersion type imidazole (trade name: 2MAOK-PW, manufactured by Shikoku Corp.)

(2) 1-Cyanoethyl-2-phenylimidazole (3) 2-Ethyl-4-methylimidazole

6. Adhesive Property Improver (1) Imidazole silane coupling agent (trade name: SP-1000, manufactured by Nikko Materials Co., Ltd.)

(2) Aminosilane coupling agent (trade name: S320, manufactured by Chisso Corp.)

7. Filler (1) Surface-hydrophobilized fumed silica (trade name: Reolosil MT-10; average particle diameter: 1 μm or lower; manufactured by Tokuyama Corp.)

(2) Spherical silica (average particle diameter: 5 μm)

8. Stress-Relaxation Property Providing Agent (1) Hydroxyl group-containing core-shell type acrylic rubber particle (trade name: Staphyloid AC-4030; manufactured by Ganz Chemical Co., Ltd.)

(2) Carboxyl group-containing core-shell type acrylic rubber particle (trade name: Zeon F 451; manufactured by Nippon Zeon Co., Ltd.;)

(3) Terminal-epoxylated modified silicone oil (trade name: KF-105; manufactured by Shin-Etsu Chemical Co., Ltd.)

9. Solvent (1) Ethyl acetate

EXAMPLE 1

76 Parts by weight of the dicyclopentadiene type solid epoxy resin, 20 parts by weight of the naphthalene type liquid-state epoxy resin, 4 parts by weight of the epoxy group-containing acrylic resin-a, 60 parts by weight of the trialkyltetrahydrophthalic anhydride, 8 parts by weight of the isocyanuric acid-modified solid dispersion type imidazole, and 2 parts by weight of the imidazole silane coupling agent were uniformly kneaded by a homo-dispersion type stirring apparatus to obtain an adhesive epoxy resin paste.

EXAMPLES 2 TO 4 AND COMPARATIVE EXAMPLES 1 AND 2

Adhesive epoxy resin pastes were produced in the same manner as Example 1, except that the blending composition of the adhesive epoxy resin paste was changed to the compositions as shown in Table 1.

The properties (1. gelling ratio; 2. Initial adhesive force-A; and 3. Foaming state at 200° C.) of the adhesive epoxy resin pastes obtained in Examples 1 to 4 and Comparative Examples 1 and 2 were evaluated by the following methods. The results were shown in Table 1.

1. Gelling Ratio

Each adhesive epoxy resin paste was heated and cured under two different conditions: 170° C.-1 minute and 170° C.-2 minutes in an oven. Next, each cured product was immersed in ethyl acetate at normal temperature for 24 hours and then un-dissolved matters were separated by filtration and the product was sufficiently dried and after that the weight ratio (weight after immersion/weight before immersion) of the cured product before and after immersion in ethyl acetate was calculated to obtain the gelling ratio (% by weight).

2. Initial Adhesive Force-A

One droplet of each adhesive epoxy resin paste was dripped on a FR-4 glass epoxy substrate and a spacer of 5 mm square was put in the surrounding of the droplet and a silicon chip of 10 mm square bearing $SiO_2$ passivation was stuck thereto and then the paste was heated and cured at 170° C. for 30 minutes to obtain a joined body. Jigs were attached to the top and down faces of the obtained joined body and pulled up and down at 5 mm/min tensile speed to measure the maximum breaking strength (N/25 $mm^2$) as the initial adhesive force-A.

3. Foaming State at 200° C.

Each adhesive epoxy resin paste was put in an oven at 200° C. and taken out after 1 minute and the foaming state was observed with eyes to evaluate the foaming state at 200° C. according to the following determination standard.

[Determination Standard]

TABLE 1

|  |  | Examples | | | | Comperative Examples | |
|---|---|---|---|---|---|---|---|
|  |  | 1 | 2 | 3 | 4 | 1 | 2 |
| Composition (part by weight) | dicyclopentadiene type solid epoxy resin | 76 | 78 | 76 | 48 | 76 | 48 |
|  | naphthalene type liquid-state epoxy resin | 20 | 20 | 20 | 50 | 20 | 50 |
|  | epoxy group-containing acrylic resin-a | 4 | 2 | — | — | — | — |
|  | epoxy group-containing acrylic resin-b | — | — | 4 | 2 | — | — |
|  | trialkyltetrahydrophthalic anhydride | 60 | 60 | 60 | 52 | 60 | 52 |

TABLE 1-continued

|  |  | Examples | | | | Comperative Examples | |
|---|---|---|---|---|---|---|---|
|  |  | 1 | 2 | 3 | 4 | 1 | 2 |
|  | isocyanuric acid-modified solid dispersion type imidazole | 8 | 8 | 8 | 8 | 8 | 8 |
|  | imidazole silane coupling agent | 2 | 2 | 2 | 0.5 | 2 | 0.5 |
|  | surface-hydrophobilized fumed silica | — | 4 | 4 | 4 | 4 | 4 |
|  | hydroxyl group-containing core-shell type acrylic rubber particle | — | — | 5 | 5 | 5 | 5 |
| Evaluation | gelling ratio   curing at 170° C. for 1 min | 100 | 100 | 58 | 55 | 35 | 15 |
|  | (% by weight)   curing at 170° C. for 2 min | 100 | 100 | 100 | 100 | 100 | 100 |
|  | initial adhesive force-A (N/25 mm$^2$) | 412 | 441 | 588 | 568 | 304 | 343 |
|  | foaming state at 200° C. | ○ | ○ | ○ | ○ | X | X |

From the results shown in Table 1, all of the adhesive epoxy resin pastes obtained in Examples 1 to 4 were found having a high gelling ratio and good or excellent in curing property and excellent in the initial adhesive force-A and showed no foaming at 200° C. to suppress void formation.

On the other hand, the adhesive epoxy resin pastes obtained in Comparative Examples 1 and 2 to which no high molecular polymer having an epoxy group (epoxy group-containing acrylic resin) was added were both found having a low gelling ratio at the time of curing at 170° C. for 1 minute and inferior in curing property and also inferior in the initial adhesive force-A and showed foaming at 200° C. and thus void formation could not be suppressed.

EXAMPLE 5

76 Parts by weight of the dicyclopentadiene type solid epoxy resin, 20 parts by weight of the naphthalene type liquid-state epoxy resin, 10 parts by weight of the epoxy group-containing acrylic resin-a, 50 parts by weight of the trialkyltetrahydrophthalic anhydride, 8 parts by weight of the isocyanuric acid-modified solid dispersion type imidazole, 2 parts by weight of the aminosilane coupling agent, and 4 parts by weight of the surface-hydrophobilized fumed silica were dissolved in ethyl acetate and uniformly stirred and mixed by a homo-dispersion type stirring apparatus at 3,000 rpm stirring speed to obtain an ethyl acetate solution of a curable resin composition with 50 wt % solid content.

Next, the obtained ethyl acetate solution of a curable resin composition was applied by a bar coater to a releasing treated face of a 50 μm thick poly(ethylene terephthalate) (PET) sheet, which was surface-treated for releasing, in a manner that the thickness of the composition would be 50 μm after dying and dried at 110° C. for 3 minutes to obtain an adhesive epoxy resin sheet.

EXAMPLE 6 AND COMPARATIVE EXAMPLE 3

Ethyl acetate solutions of curable resin compositions (50 wt % solid content) and adhesive epoxy resin sheets were produced in the same manner as Example 5, except that the blending composition of the adhesive epoxy resin sheet (the curable resin composition) was changed to the compositions as shown in Table 2.

The properties (4. Observation by transmission electron microscope; 5. Glass transition temperature of cured product; 6. Initial adhesive force-B; and 7. Adhesive force after PCT 100 hours) of the adhesive epoxy resin sheets obtained in Examples 5 and 6 and Comparative Examples 3 were evaluated by the following methods. The results were shown in Table 2.

4. Observation by Transmission Electron Microscope

Each adhesive epoxy resin sheet cured by aging at 170° C. for 30 minutes was cut into a thin film by a microtome and the thin film was dyed with osmium tetraoxide. The obtained specimen was observed by a transmission electron microscope (100,000 magnification) to observe the dyed phase separation structure.

5. Glass Transition Temperature of Cured Product

After each adhesive epoxy resin sheet was cured by heating at 170° C. for 30 minutes, the viscoelasticity of the cured product was measured under condition of 3° C./min temperature rising speed in tensile mode and the measured peak temperature of tan δ was defined as the glass transition temperature (° C.).

6. Initial Adhesive Force-B

Each adhesive epoxy resin sheet cut into 5 mm square size was stuck to a FR-4 glass epoxy substrate and a silicon chip bearing SiO$_2$ passivation was stuck thereto and pressed and after that curing was carried out by heating at 170° C. for 30 minutes to obtain a joined body. Jigs were attached to the top and down faces of the obtained joined body and pulled up and down at 5 mm/min tensile speed to measure the maximum breaking strength (N/25 mm$^2$) as the initial adhesive force-B.

7. Adhesive Force after 100 Hours PCT

After the joined body produced in the same manner as the case of the measurement of the initial adhesive force-B was subjected to a pressure cooker test (PCT) in condition of 120° C.-85% RH for 100 hours, the joined body was taken out and the maximum breaking strength (N/25 mm$^2$) was measured in the same manner as that in the case of 6. to find the adhesive force after 100 hours PCT.

TABLE 2

|  |  | Examples | | Comperative Examples |
|---|---|---|---|---|
|  |  | 5 | 6 | 3 |
| Composition (part by weight) | dicyclopentadiene type solid epoxy resin | 76 | 50 | 50 |
|  | naphthalene type liquid-state epoxy resin | 20 | 20 | 20 |
|  | epoxy group-containing acrylic resin-a | 10 | — | — |
|  | epoxy group-containing acrylic resin-b | — | 30 | — |

TABLE 2-continued

|  |  | Examples | | Comperative Examples |
|---|---|---|---|---|
|  |  | 5 | 6 | 3 |
|  | epoxy group-containing acrylic rubber-c | — | — | 30 |
|  | trialkyltetrahydrophthalic anhydride | 50 | 45 | 40 |
|  | isocyanuric acid-modified solid dispersion type imidazole | 8 | 8 | 8 |
|  | aminosilane coupling agent | 2 | 2 | 2 |
|  | surface-hydrophobilized fumed silica | 4 | 4 | 4 |
| Evaluation | observation by transmission electron microscope | compatible | compatible | phase separation |
|  | glass transition temperature of cured product (° C.) | 178 | 180 | 25,173 |
|  | initial adhesive force-B (N/25 mm$^2$) | 441 | 510 | 225 |
|  | adhesive force after 100 hour PCT (N/25 mm$^2$) | 392 | 451 | 20 |

From the results shown in Table 2, both of the adhesive epoxy resin sheets obtained in Examples 5 and 6 were found having a high glass transition temperature in form of cured products showing no phase separation structure in the resin phase and therefore having high initial adhesive force-B and also scarcely showing decrease of the adhesive force even after 100 hour PCT.

On the other hand, the adhesive epoxy resin sheet obtained in Comparative Example 3 by adding the epoxy group-containing acrylic rubber-c produced by solution polymerization method in place of the epoxy group-containing acrylic resin was found having a low glass transition temperature in form of a cured product, a peak of tan δ at low temperature and inferior adhesive force-B, showing phase separation structure and also showing extreme decrease of the adhesive force even after 100 hour PCT.

EXAMPLE 7

45 Parts by weight of the dicyclopentadiene type solid epoxy resin, 45 parts by weight of the naphthalene type liquid-state epoxy resin, 10 parts by weight of the epoxy group-containing acrylic resin-a, 50 parts by weight of the trialkyltetrahydrophthalic anhydride, 4 parts by weight of 1-cyanoethyl-2-phenylimidazole, 2 parts by weight of the aminosilane coupling agent, and 4 parts by weight of the surface-hydrophobilized fumed silica were dissolved in ethyl acetate and uniformly stirred and mixed by a homo-dispersion type stirring apparatus at 3,000 rpm stirring speed to obtain an ethyl acetate solution of a curable resin composition with 60 wt % solid content.

Next, the obtained ethyl acetate solution of a curable resin composition was applied by a bar coater to a releasing treated face of a 50 μm thick poly(ethylene terephthalate) (PET) sheet, which was surface-treated for releasing, in a manner that the thickness of the composition would be 40 μm after dying and dried at 110° C. for 3 minutes to obtain an adhesive epoxy resin sheet.

EXAMPLES 8 TO 12 AND COMPARATIVE EXAMPLES 4 TO 7

Ethyl acetate solutions of curable resin compositions (40 wt % solid content) and adhesive epoxy resin sheets were produced in the same manner as Example 7, except that the blending composition of the adhesive epoxy resin sheet (the curable resin composition) was changed to the compositions as shown in Table 3.

The properties (7. Observation of dyed phase separation structure by TEM (transmission electron microscope); 8. Observation of peak temperature of tan δ for viscoelasticity; 9. Measurement of swelling ratio in dimethyl sulfoxide at 120° C.; 10. Measurement of pH of extracted water; 11. Measurement of ion conductivity; 12. Measurement of extracted chlorine ion impurity; 13. Measurement of dielectric constant ε'; 14. Measurement of dielectric loss tangent; 15. Laser processibility; 16. Measurement of the lowest storage modulus G' at the time of melting; 17. Occurrence of void; 18. Measurement of electric connection of joined body by PCT; and 19. Measurement of electric connection of joined body by TCT) of the adhesive epoxy resin sheets obtained in Examples 7 to 12 and Comparative Examples 4 to 7 were evaluated by the following methods. The results were shown in Table 3.

7. Observation by Transmission Electron Microscope

Each adhesive epoxy resin sheet cured by aging at 170° C. for 30 minutes in an oven was cut into a thin film by a microtome and the thin film was dyed with osmium tetraoxide. The obtained sample was observed by a transmission electron microscope (100,000 magnification) to observe the dyed phase separation structure.

8. Observation of Peak Temperature of tan δ for Viscoelasticity

Each adhesive epoxy resin sheet cured by aging at 170° C. for 30 minutes in an oven was subjected to the viscoelasticity measurement at 3° C./min temperature rising speed in a temperature range from –10° C. to 290° C. by a tensile type viscoelasticity measurement apparatus. The obtained chart was observed and the temperature at the peak values of tan δ was written without omitting any value even if there were two or more peaks.

9. Measurement of Swelling Ratio in Dimethyl Sulfoxide at 120° C.

Each adhesive sheet cured at 170° C. for 30 minutes was weighed and then immersed in dimethyl sulfoxide (DMSO) heated at 120° C. for 5 minutes. After 5 minutes, the sheet was taken out and again weighed by a balance after the solvent was wiped out well.

DMSO swelling ratio (%)=(weight after immersion–weight in the initial stage)/(weight in the initial stage)×100

10. Measurement of pH of Extracted Water

After each adhesive epoxy resin sheet was cured by heating at 170° C. for 30 minutes in an oven, the obtained cured product of the adhesive epoxy resin sheet 1 g was weighed. Next, the cured product was cut into small pieces and put in a glass test tube and distilled water 10 g was also added to the test tube. The test tube was sealed and heated by a burner in an oven at 110° C. for 12 hours while being periodically shaken to carry out extraction and then the pH of the extracted water was measured by a pH meter.

11. Measurement of Ion Conductivity

The ion conductivity (μS/cm) of the extracted water was measured by an ion conductivity measurement apparatus.

12. Measurement of Extracted Chlorine Ion Impurity

The chlorine ion impurity amount (ppm) in the extracted water was measured by ion chromatography.

13. Measurement of dielectric constant $\epsilon'$ and 14.

Measurement of Dielectric Loss Tangent

The dielectric constant and dielectric loss tangent of each sample after curing at 170° C. for 30 minutes were measured at 1 GHz frequency.

15. Laser Processibility

Each adhesive epoxy resin sheet bearing PET sheets in the top and down faces was processed to from a circular hole (about 100 μm diameter) by carbonic acid gas laser and the formed hole shape was observed with a microscope and the laser processibility was evaluated according to the following determination standard.

[Determination Standard]

◯: Both hole shape and smoothness of the through holes were good and x: The hole shape was distorted.

16. Measurement of the Lowest Storage Modulus G' at the Time of Melting

After each adhesive epoxy resin sheet (before curing) was layered by a thermal laminator to have a thickness of about 600 μm, the laminate was heated at 45° C./min temperature rising speed from 25° C. to 200° C. and the elastic modulus (G') at shearing was measured at 100 rad/s frequency. In this case, melting and curing of the adhesive epoxy resin sheet simultaneously took place and the minimum value of the elastic modulus was defined as the lowest storage modulus {(G') Pa} and measured.

17. Measurement of Occurrence of Void

While sandwiching each adhesive epoxy resin sheet between them, a glass epoxy substrate and a silicon chip (1 cm square) were thermally pressed at 200° C. for 30 seconds to bond them each other and occurrence of void formation at that time was confirmed by using a scan acoustic tomogragh.

18. Measurement of Electric Connection of Joined Body by PCT

The epoxy sheet was stuck to a glass/epoxy type FR-4 substrate of 20 mm×20 mm×1.0 mm thickness size bearing a wiring (18 μm thickness copper foil plated with 5 μm nickel and 0.3 μm gold) so arranged as to form a daisy chain in combination with metal wiring of an IC chip in the case where electric connection is formed with the IC chip. After that, an IC chip [size: 10 mm×10 mm; and having 172 gold stud bumps (size 100 μm; height about 50 μm) peripherally arranged by previous wire bonding] and the electrode substrate were joined through the sheet under 78 N/cm² load by heating at 190° C. for 15 seconds and successively at 230° C. for 15 seconds and ages at 125° C. for 1 hour to obtain an electrically connected joined body.

After it was confirmed that all of the electrodes of the obtained electrically connected joined body had high electric connection resistance stability at normal temperature, the electrically connected joined body was subjected to a pressure cooker test (PCT) (120° C., 85% RH) and the time until the entire connection resistance value was change by 10% in the PCT environments was measured.

19. Measurement of Electric Connection of Joined Body by TCT

The electrically connected joined body was produced in the same method as described above and the joined body was subjected to a thermal cycle test (TCT) (−40° C.↔125° C. for 10 minutes each) by a thermal cycle tester and the joined body was taken out after proper cycles to observe the alteration of the electric connection resistance value. The number of cycles when the electric connection resistance value was changed 10% or higher was counted.

TABLE 3

| | | Examples | | | | | |
|---|---|---|---|---|---|---|---|
| | | 7 | 8 | 9 | 10 | 11 | 12 |
| Composition (part by weight) | naphthalene type epoxy resin | 45 | 45 | 45 | 45 | 45 | 45 |
| | dicyclopentadiene type epoxy resin | 45 | 45 | 45 | 45 | 45 | 45 |
| | epoxy group-containing acrylic resin-a | 10 | 10 | 10 | 10 | 10 | 10 |
| | epoxy group-containing acrylic rubber-d | — | — | — | — | — | — |
| | polyvinyl butyral resin | — | — | — | — | — | — |
| | trialkyltetrahydrophthalic anhydride | 50 | 50 | 50 | 50 | 50 | 58 |
| | dicyandiamide | — | — | — | — | — | — |
| | 2-ethyl-4-methylimidazole | — | — | — | — | — | 6 |
| | 1-cyanoethyl-2-phenylimidazole | 4 | 4 | 6 | 4 | 6 | — |
| | aminosilanecoupling agent | 2 | 2 | 2 | 2 | 2 | 2 |
| | surface-hydrophobilized fumed silica (average particle diameter 10 nm; maximum 12 nm) | — | 4 | 4 | 4 | — | 4 |
| | spherical silica (average particle diameter 5 μm; maximum <15 μm) | — | — | — | — | — | — |
| | hydroxyl group-containing core-shell type acrylic rubber particles | — | 5 | — | — | — | — |
| | carboxyl group-containing core-shell type acrylic rubber particles | — | — | 10 | — | — | — |
| Evaluation | dyed phase separation structure by TEM | compatible | — | — | compatible | compatible | compatible |
| | peak temperature of tan δ for viscoelasticity (° C.) | 178 | 178 | 182 | 178 | 185 | 172 |
| | swelling ratio in DMSO at 120° C. | 28 | 30 | 25 | — | — | — |
| | pH of extracted water | 7 | 7.2 | 7.9 | 8 | 7.4 | 4.7 |
| | ion conductivity (μS/cm) | 40 | 35 | 42 | 40 | 55 | 140 |
| | extracted chloride ion impurity (ppm) | 5 | 3 | 5 | 3 | 6 | 146 |
| | dielectric constant $\epsilon'$ | 3.1 | 3.1 | 3.1 | — | — | — |
| | dielectric loss tangent tan δ | 0.015 | 0.015 | 0.016 | — | — | — |

TABLE 3-continued

|  |  | | | | | | |
|---|---|---|---|---|---|---|---|
|  | laser processability | ○ | ○ | ○ | ○ | ○ | ○ |
|  | the lowest storage elastic modulus G' at the time of melting ($10^3$/Pa) | 3 | 5 | — | — | — | — |
|  | occurrence of void formation | none | none | none | none | none | none |
|  | conductive connection stability in PCT (h) | >400 | >400 | 350 | >400 | >400 | — |
|  | conductive connection stability in TCT (cycle) | 900 | >1000 | >1000 | >1000 | >1000 | — |

|  |  | Comperative Examples | | | |
|---|---|---|---|---|---|
|  |  | 4 | 5 | 6 | 7 |
| Composition (part by weight) | naphthalene type epoxy resin | 45 | 45 | 45 | 45 |
|  | dicyclopentadiene type epoxy resin | 45 | 45 | 45 | 45 |
|  | epoxy group-containing acrylic resin-a | — | 10 | 10 | — |
|  | epoxy group-containing acrylic rubber-d | 5 | 5 | 30 | — |
|  | polyvinyl butyral resin | — | — | — | 10 |
|  | trialkyltetrahydrophthalic anhydride | 50 | 50 | 50 | — |
|  | dicyandiamide | — | — | — | 5 |
|  | 2-ethyl-4-methylimidazole | — | — | — | — |
|  | 1-cyanoethyl-2-phenylimidazole | 4 | 4 | 4 | 1.5 |
|  | aminosilanecoupling agent | 2 | 2 | 2 | 2 |
|  | surface-hydrophobilized fumed silica (average particle diameter 10 nm; maximum 12 nm) | — | 4 | 4 | — |
|  | spherical silica (average particle diameter 5 μm; maximum <15 μm) | 100 | — | — | — |
|  | hydroxyl group-containing core-shell type acrylic rubber particles | — | — | — | — |
|  | carboxyl group-containing core-shell type acrylic rubber particles | — | — | — | — |
| Evaluation | dyed phase separation structure by TEM | phase separation | phase separation | phase separation | phase separation |
|  | peak temperature of tan δ for viscoelasticity (° C.) | −20.175 | −25.173 | −25.170 | 92.220 |
|  | swelling ratio in DMSO at 120° C. | 55 | 50 | 85 | — |
|  | pH of extracted water | — | 7.5 | 7 | 9.1 |
|  | ion conductivity (μS/cm) | 75 | 72 | 80 | 350 |
|  | extracted chloride ion impurity (ppm) | — | 19 | 25 | 173 |
|  | dielectric constant ∈' | — | — | — | 3.5 |
|  | dielectric loss tangent tan δ | — | — | — | 0.02 |
|  | laser processability | X | ○ | ○ | ○ |
|  | the lowest storage elastic modulus G' at the time of melting ($10^3$/Pa) | 0.5 | — | — | — |
|  | occurrence of void formation | occuring | none | none | none |
|  | conductive connection stability in PCT (h) | <100 | <200 | <100 | 300 |
|  | conductive connection stability in TCT (cycle) | >1000 | >1000 | 500 | >1000 |

From the result shown in Table 3, the adhesive epoxy resin sheets obtained in Examples 7 to 11 did not show phase separation structure and accordingly their DMSO swelling ratios at high temperature were found extremely low.

On the other hand, the sheets of Comparative Examples 4 to 6 showing phase separation structure were found having two peak values of tan δ and also rather high DMSO swelling ratios. With respect to the adhesive epoxy resin sheets of Example 12 and Comparative Example 7 having pH of extracted water in about neutral range, the ion conductivity was relatively high and it means isolated ions were eluted. In this case, it can be understood that the amount of the chlorine ion impurity supposed to cause considerable effects on the electric insulating property and electrode corrosion was very high. Further, the adhesive epoxy resin sheet of Comparative Example 7 was found having high values of both dielectric constant and dielectric loss tangent, which are undesired physical property values.

Regarding the lowest storage modulus at the time of melting, the adhesive epoxy resin sheet obtained in Comparative Example 4 was found having an extremely low value and accordingly, the sheet was impossible to suppress foaming owing to evaporating components and gave a joined body of which the adhesive resin phase contained voids. In comparison of the adhesive epoxy resin sheet obtained in Example 7 and the adhesive epoxy resin sheet obtained in Example 8, although slightly, the adhesive epoxy resin sheet obtained in Example 8 containing the core-shell rubber particles was found having improved TCT cycle property. It is supposedly attributed to curing of the rubber particles in the stress relaxation state.

Semiconductor packages for evaluation were produced using 8-inch wafers and the ethyl acetate solutions of the curable resin compositions obtained in Examples 7 to 9 as interlayer adhesives by the following method.

At first, each interlayer adhesive was applied in a thickness of 25 μm in cured state to an 8-inch silicon wafer having peripherally arranged copper bumps with a size of 110 μm×110 μm and height 20 μm by a spin coater. After the coating, the wafer was put in a hot air blowing drying furnace in conditions of 110° C.×5 minutes+120° C.×60 minutes to cure the interlayer adhesive. Next, the surface layer part of the cured interlayer adhesive was ground with a grinder to expose the copper bumpers.

By a known photolithographic method, a re-wiring copper-wiring pattern was formed so as to arrange the copper post positions bearing solder balls of the package in area arrangement. After formation of the re-wiring copper circuit pattern, the copper posts were formed by a known photolithographic method and using a known wafer level solder ball mounter, a wafer level package in which the solder balls (diameter 300 μm) were disposed was produced. Next, the water in which the solder balls were already disposed was diced to produce respective ICs (size: 10 mm×10 mm, 172 bumps arranged in area-state) which were used as semiconductor packages for evaluation.

Each of the obtained semiconductor packages for evaluation was subjected to evaluation of the soldering heat resistance, conduction reliability in PCT environments, and conduction reliability in TCT environments to find that the each package had 5 times or more soldering heat resistance, 400 hour PCT reliability, and 1,000 cycles or more TCT reliability.

Accordingly, it was confirmed that the ethyl acetate solutions of the curable resin compositions produced in Examples 7 to 9 were also advantageously usable as the interlayer adhesive.

In this case the semiconductor wafer re-wiring package substrate was produced as the semiconductor package for evaluation and similar results could be obtained in the case of build-up printed circuit boards and the like.

EXAMPLE 13

45 Parts by weight of the dicyclopentadiene type solid epoxy resin, 45 parts by weight of the naphthalene type liquid-state epoxy resin, 4 parts by weight of the epoxy group-containing acrylic resin (average molecular weight 10,000, epoxy equivalent 500), 50 parts by weight of the trialkyltetrahydrophthalic anhydride, 4 parts by weight of 1-cyanoethyl-2-phenylimidazole, and 2 parts by weight of the aminosilane coupling agent were uniformly kneaded by a homo-dispersion type stirring apparatus to obtain an adhesive epoxy resin paste which was used as a non-conductive paste.

EXAMPLES 14 TO 21 AND COMPARATIVE EXAMPLES 8 AND 9

Non-conductive pastes (Examples 14 to 16) and anisotropic conductive pastes (Examples 17 to 21, Comparative Examples 8 and 9) were produced in the same manner as Example 13, except that the blending composition of the paste was changed to the compositions as shown in Table 4.

The properties (pH of extracted water, amount of chlorine ion impurity, dyed phase separation structure by TEM, peak temperature of tan δ in viscoelasticity measurement; ion conductivity; dielectric constant ($\epsilon'$); and dielectric loss tangent (tan δ)) of the non-conductive pastes or anisotropic conductive pastes of Examples 13 to 21, Comparative Examples 8 and 9 were evaluated by the methods as described above.

Further, semiconductor packages for evaluation were produced using the anisotropic conductive pastes obtained in Examples 17 to 21 and Comparative Examples 8 and 9, IC chips, and substrates by the following method.

As the IC chips (size: 10 mm×10 mm), those comprising 172 gold stud bumps (size 100 μm and height about 50 μm) peripherally arranged by previous wire bonding were used and as the substrates, those (glass/epoxy type FR-4 substrates) of 20 mm×20 mm×1.0 mm thickness size bearing a wiring (18 μm thickness copper foil plated with 5 μm nickel and 0.3 μm gold) so arranged as to form a daisy chain in combination with metal wiring of an IC chip in the case where electric connection is formed with the IC chip were used.

At first, each substrate was dried at 120° C. for 6 hours in a hot air blow drying furnace to remove water from the substrate.

Next, each of anisotropic conductive pastes obtained in Examples 17 to 21 and Comparative Examples 8 and 9 was packed in a syringe (manufactured by Musashi Engineering Co., Ltd.). A precision nozzle (manufactured by Musashi Engineering Co., Ltd., nozzle tip end diameter 0.3 mm) was attached to the tip end of the syringe and using a dispenser (manufactured by Musashi Engineering Co., Ltd.), each anisotropic conductive paste was applied in about 40 mg application amount to the area of the IC chip joining on the dried substrate.

The electrode part of the coated substrate and the electrode part of the IC chip were flip chip connected by a flip chip bonder (DB 100, manufactured by Shibuya Kogyo Co., Ltd.). The connection conditions were 78 N/cm$^2$, 190° C.×15 s+230° C.×15 s. After that, the resin was completely cured at 120° C. for 1 hour in a hot air blow drying furnace to obtain each of the semiconductor packages for evaluation.

Each of the obtained semiconductor packages was subjected to the evaluation of the properties, 20. soldering heat resistance, by the following method and the conduction reliability in PCT environments and conduction reliability in TCT environments by the method. The results were shown in Table 4. No measurement was carried out for the columns marked with "–" in Table 4.

20. Soldering Heat Resistance

After each semiconductor package for evaluation was treated in drying condition of 125° C.×6 hr and in wetting condition of 30° C./80%×48 hr, the package was treated in solder reflow profiling condition of 250° C.×30 s and the electrode electric connection, resistance value alteration, and separation between layers after treatment were confirmed. After reflow, each sample was treated in wetting condition of 30° C./80%×48 hr again and then further treated in solder reflow profiling condition of 250° C.×30 s and the electrode electric connection, resistance value alteration, and separation between layers after the second reflow treatment were confirmed. Such treatment was repeated so as to carry out reflow treatment 5 times and the soldering heat resistance was evaluated every time. Even in the case where the electric connection was confirmed, if the resistance value alteration was fluctuated as compared with the resistance value in the initial stage by 10% or more, the semiconductor package was determined to be defective. The interlayer separation was confirmed by a scan acoustic tomograph (Mi-Scope Hyper II, manufactured by Hitachi Kenki Fine Tech Co., Ltd.).

TABLE 4

| | | Examples | | | | | |
|---|---|---|---|---|---|---|---|
| | | 13 | 14 | 15 | 16 | 17 | 18 |
| Composition (part by weight) | naphthalene type epoxy resin | 45 | 65 | 45 | 45 | 45 | 45 |
| | dicyclopentadiene type epoxy resin | 45 | 25 | 45 | 45 | 45 | 45 |
| | epoxy group-containing acrylic resin-b | 4 | 4 | 2 | 4 | 4 | 4 |
| | trialkyltetrahydrophthalic anhydride | 50 | 55 | 50 | 50 | 50 | 50 |
| | epoxy group-containing acrylic rubber-d | — | — | — | — | — | — |
| | 1-cyanoethyl-2-phenylimidazole | 4 | 4 | 4 | 6 | 4 | 4 |
| | aminosilane coupling agent | 2 | 2 | 2 | 2 | 2 | 2 |
| | spherical silica (average particle diameter 5 μm; maximum <15 μm) | — | — | — | — | — | — |

TABLE 4-continued

| | | | | | | |
|---|---|---|---|---|---|---|
| surface-hydrophobilized fumed silica (average particle diameter 10 nm; maximum 12 nm) | — | — | 4 | 4 | — | — |
| hydroxyl group-containing core-shell type acrylic rubber particles | — | — | 5 | 5 | — | — |
| Ag particles (average particle diameter 7 μm) | — | — | — | — | 20 | — |
| Ni particles (average particle diameter 7 μm) | — | — | — | — | — | 20 |
| resin core-Au plated particles (average particle diameter 3 μm) | — | — | — | — | — | — |
| insulating coating-coated resin core-Au plated particles (average particle diameter 2 μm) | — | — | — | — | — | — |
| Evaluation: dyed phase separation structure by TEM (only resin layer) | compatible | compatible | — | — | — | — |
| peak temperature of tan δ for viscoelasticity (° C.) | 178 | 185 | 178 | 182 | 178 | 180 |
| pH of extracted water | 7 | 7.1 | 7.2 | 7.9 | 7 | 7.1 |
| extracted chloride ion impurity (ppm) | 5 | 4 | 3 | 5 | 5 | 4 |
| ion conductivity (μS/cm) | 40 | 30 | 35 | 42 | 40 | 30 |
| dielectric constant ∈' | 3.1 | 3.1 | 3.1 | 3.1 | 3.1 | 3.1 |
| dielectric loss tangent tan δ | 0.015 | 0.015 | 0.015 | 0.016 | 0.015 | 0.015 |
| conductive connection stability in PCT (h) (resistance value alteration within 10%) | 300 | 300 | >400 | >400 | 300 | 300 |
| conductive connection stability in TCT (cycle) (resistance value alteration within 10%) | 800 | 900 | >1000 | >1000 | 800 | 900 |
| soldering heat resistance (times) (resistance value alteration within 10%) | 5 | 5 | 5 | 5 | 5 | 5 |

| | | Comperative Example | | | | |
|---|---|---|---|---|---|---|
| | | 19 | 20 | 21 | 8 | 9 |
| Composition (part by weight) | naphthalene type epoxy resin | 45 | 45 | 45 | 45 | 65 |
| | dicyclopentadiene type epoxy resin | 45 | 45 | 45 | 45 | 25 |
| | epoxy group-containing acrylic resin-b | 4 | 4 | 4 | — | — |
| | trialkyltetrahydrophthalic anhydride | 50 | 50 | 50 | 50 | 55 |
| | epoxy group-containing acrylic rubber-d | — | — | — | 4 | 4 |
| | 1-cyanoethyl-2-phenylimidazole | 4 | 4 | 4 | 4 | 4 |
| | aminosilane coupling agent | 2 | 2 | 2 | 2 | 2 |
| | spherical silica (average particle diameter 5 μm; maximum <15 μm) | — | — | — | — | — |
| | surface-hydrophobilized fumed silica (average particle diameter 10 nm; maximum 12 nm) | 4 | 4 | 4 | — | — |
| | hydroxyl group-containing core-shell type acrylic rubber particles | 5 | 5 | 5 | — | — |
| | Ag particles (average particle diameter 7 μm) | — | — | — | 20 | 20 |
| | Ni particles (average particle diameter 7 μm) | 20 | — | — | — | — |
| | resin core-Au plated particles (average particle diameter 3 μm) | — | 20 | — | — | — |
| | insulating coating-coated resin core-Au plated particles (average particle diameter 2 μm) | — | — | 30 | — | — |
| Evaluation | dyed phase separation structure by TEM (only resin layer) | — | — | — | phase separation | phase separation |
| | peak temperature of tan δ for viscoelasticity (° C.) | 178 | 178 | 182 | −15.178 | −15.173 |
| | pH of extracted water | 7.2 | 7.1 | 7.9 | 6.5 | 4.5 |
| | extracted chloride ion impurity (ppm) | 3 | 4 | 5 | 14 | 140 |
| | ion conductivity (μS/cm) | 35 | 32 | 42 | 70 | 95 |
| | dielectric constant ∈' | 3.1 | 3.1 | 3.1 | 3.1 | 3.1 |
| | dielectric loss tangent tan δ | 0.015 | 0.015 | 0.016 | 0.015 | 0.015 |
| | conductive connection stability in PCT (h) (resistance value alteration within 10%) | >400 | >400 | >400 | 200 | 300 |
| | conductive connection stability in TCT (cycle) (resistance value alteration within 10%) | >1000 | >1000 | >1000 | >1000 | >1000 |
| | soldering heat resistance (times) (resistance value alteration within 10%) | 5 | 5 | 5 | 3 | 3 |

From the results shown in Table 4, the anisotropic conductive pastes obtained in Examples 17 to 21 were found having a little of chlorine ion impurity. With respect to the anisotropic conductive pastes obtained in Example 17 containing an epoxy group-containing acrylic resin compatible with dicyclopentadiene type solid epoxy resin and naphthalene type liquid-state epoxy resin, no phase separation was observed in the epoxy resin matrix by TEM observation of its cured body and the anisotropic conductive pastes obtained in Examples 17 to 21 were all found having low ion conductivity. The semiconductor packages for evaluation produced by using the anisotropic conductive pastes obtained in Examples 17 to 21 were excellent in soldering heat resistance and the electric connection stability in PCT environments and TCT environments. Further, the semiconductor packages produced by using the anisotropic conductive pastes containing low elastic particles (core-shell type acrylic rubber particles) and obtained in Examples 19 to 21 were found more excellent in the electric connection stability in PCT environments and TCT environments than the semiconductor packages produced by using the anisotropic conductive pastes containing no such particles and obtained in Examples 17 and 18.

On the other hand, with respect to the anisotropic conductive pastes obtained in Comparative Examples 8 and 9 containing an epoxy group-containing acrylic rubber non-compatible with naphthalene type liquid-state epoxy resin and dicyclopentadiene type solid epoxy resin, phase separation structure was observed in the epoxy resin matrix by TEM observation of their cured bodies and the anisotropic conductive pastes were found having high ion conductivity.

Further, semiconductor packages for evaluation were produced using the adhesive epoxy resin pastes obtained in Examples 13 to 15 as underfill resins by connecting semiconductor chips with substrates by the following method.

A semiconductor chip (size: 10 mm×10 mm and bump size: 100 μm and height about 100 μm) bearing peripherally arranged 172 high melting point solder bumps was put on a chip mounting part of a substrate (4 layer substrate) produced by subjecting a substrate base equivalent to a glass epoxy substrate FR-4 to Cu-wiring step, through hole plating, and solder resist step and the chip and the substrate were in a flip chip bonder and while the chip was held in face down state, the positioning of the bump part and the substrate terminal part on the opposite was carried out and after that the chip and the substrate was pressure-bonded at 230° C. and 10 Kg pressure for 5 second pressure application. At that moment, it was confirmed that joining of the solder bumps and the substrate terminal parts and the adhesion of the chip surface and the substrate were simultaneously completed and the solder bumps were cylindrically extended.

After that, solder reflow was carried out at 230° C. for 20 seconds in a common IR reflow furnace. It was confirmed that through this process, erroneous positioning of the face down bonding was corrected and moreover that the cylindrical solder bump shape was maintained.

Next, an underfill resin of the invention was packed in a syringe (manufactured by Musashi Engineering Co., Ltd.). A precision nozzle (manufactured by Musashi Engineering Co., Ltd., nozzle tip end diameter 0.3 mm) was attached to the tip end of the syringe and using a dispenser, the gap between the chip and the substrate was filled with the resin from the chip end part.

Next, after the resin was completely cured in condition of 125° C.×1 hour in a hot air blow drying furnace, the entire back face of the chip was coated using a sealing material (Epoxy Molding Compound CEL 9200, manufactured by Hitachi Chemical Co., Ltd.) by common transfer molding (molding temperature 180° C., molding pressure 1.5 kN/cm$^2$) to obtain a sealed product. After that, using a solder ball forming facility, solder balls were formed in array-like state to the back face of the substrate to obtain each semiconductor package for evaluation.

Each obtained package for evaluation was subjected to a thermal cycle test between −45° C. to 125° C. to evaluate electric connection and no abnormality in the electric connection was found even after 1,000 cycles and no solder bump disconnection was confirmed. The semiconductor package for evaluation subjected to the test was cut to observe the periphery of the bump part and it was confirmed that no crack was formed in the entire peripheries of the respective solder bumps and in the outer circumferential part of the semiconductor chip. When the package which was moisturized in condition of 30° C. and 80% RH for 48 hours and then subjected to solder dip (280° C. for 30 second) was observed by a scan acoustic tomograph facility, neither separation nor cracking in the interface between the sealing resin and the chip passivation surface was observed. Further, even after being subjected to high temperature and high humidity test (120° C./85% RH, 500 hours), no abnormality of electric connection was observed and no disconnection of the solder bumps was confirmed. When the semiconductor package for high temperature and high humidity test evaluation was cut to observe the periphery of the bump part and it was confirmed that no crack was formed in the entire peripheries of the respective solder bumps and in the outer circumferential part of the semiconductor chip.

From these findings, the adhesive epoxy resin pastes obtained in Examples 13 to 15 were confirmed to be preferably usable as underfill.

EXAMPLE 22

45 Parts by weight of the dicyclopentadiene type solid epoxy resin, 45 parts by weight of the naphthalene type liquid-state epoxy resin, 10 parts by weight of the epoxy group-containing acrylic resin-a, 50 parts by weight of the trialkyltetrahydrophthalic anhydride, 4 parts by weight of the 1-cyanoethyl-2-phenylimidazole, 2 parts by weight of the aminosilane coupling agent, and 20 parts by weight of silver particles (average particle diameter 7 μm) were dissolved in ethyl acetate and uniformly stirred and mixed by a homo-dispersion type stirring apparatus at 3,000 rpm stirring speed to obtain an ethyl acetate solution of a curable resin composition with 40 wt % solid content. The silver particles were used in varnish state.

Next, the obtained ethyl acetate solution of a curable resin composition was applied by a bar coater to a releasing treated face of a 50 μm thick poly(ethylene terephthalate) (PET) sheet, which was surface-treated for releasing, in a manner that the thickness of the composition would be 42 μm after dying and dried at 110° C. for 3 minutes to form an adhesive epoxy resin layer. Two PET sheets each bearing the adhesive epoxy resin layer formed as described above were laminated at 80° C. while the adhesive epoxy resin layers were face to face to obtain an adhesive epoxy resin sheet. The obtained adhesive epoxy resin sheet was thus composed of two PET sheets and an adhesive epoxy resin layer sandwiched between the PET sheets.

EXAMPLES 23 TO 26 AND COMPARATIVE EXAMPLES 10 AND 11

Conductive connection sheets where no conductive fine particle was exposed (Examples 22 to 26 and Comparative Examples 10 and 11) and a conductive connection sheet where conductive fine particles were exposed (Example 27) were produced in the same manner as Example 22, except that the blending composition was changed to the compositions as shown in Table 5.

As the conductive fine particles in Table 5, the following particles were used in varnish state and mixed with resins.

Silver particles: average particle diameter 7 μm

Nickel particles: average particle diameter 7 μm

Resin core-gold plated particles: average particle diameter 3 μm (Micropearl AU, manufactured by Sekisui Chemical Co., Ltd.)

Insulating coating-coated resin core-gold plated particles: average particle diameter 2 μm (Micropearl AU coated with thermoplastic resin, manufactured by Sekisui Chemical Co., Ltd.)

EXAMPLE 27

Each of the obtained adhesive epoxy resin sheets with length 2 cm and width 2 cm size was processed by $CO_2$ laser so as to form tapered through holes of 120 μm in the front face and 85 μm in the rear face in a plurality of rows to form 172 pin type electrode terminals per 1 cm square at proper positions to conform to the positions of electrodes of an IC chip. The intervals between neighboring rows were about 4 mm and the respective though holes in each row were arranged at 200 μm pitches and the respective through holes had 2% CV value and 1.04 aspect ratio (the longer hole diameter/the shorter hole diameter) of the hole diameter.

While suction ports with 8 mm diameter were attached to the rear side of each adhesive epoxy resin sheet to cover all of the through holes and at the same time prevent leakage and suction at −50 kPa vacuum was carried out, the conductive fine particles (conductive fine particles having average particle diameter 105 μm, plated with 0.2 μm thick nickel plating in surface layer and further with 2.3 μm thick gold plating) existing in the surface side of the adhesive epoxy resin sheet were sucked for several seconds. In this case, the suction was carried out in a manner that the conductive fine particles were not sucked to anywhere other than the though holes of the adhesive epoxy resin sheet, attaching steel mesh with 50 μm openings for a support of the adhesive epoxy resin sheet to the suction ports, and further removing static electricity. After the respective through holes of the adhesive epoxy resin sheet were filled just properly with the conductive fine particles by the suction of the conductive fine particles, the suction was stopped to obtain a conductive connection sheet. After suction, by way of precaution, foreign substances on the surface of the conductive connection sheet were removed with a soft brush. The conductive connection sheet in this stage was in un-cured state.

The conductive connection sheets obtained in Examples 23 to 27 and Comparative Examples 10 and 11 were subjected to the evaluation of the properties (pH of extracted water, amount of chlorine ion impurity, dyed phase separation structure by TEM, peak temperature of tan δ in viscoelasticity measurement; ion conductivity; dielectric constant ($\epsilon'$); and dielectric loss tangent (tan δ)) were evaluated by the methods as described above. Further, semiconductor packages for evaluation were produced using the conductive connection sheets obtained in Examples 23 to 27 and Comparative Examples 10 and 11 by the method and the semiconductor packages were subjected to evaluation of soldering heat resistance, conduction reliability in PCT environments, and conduction reliability in TCT environments. The results were shown in Table 5.

TABLE 5

| | Composition | Examples | | | | | | Comperative Examples | |
|---|---|---|---|---|---|---|---|---|---|
| | | 22 | 23 | 24 | 25 | 26 | 27 | 10 | 11 |
| Adhesive epoxy resin sheet | naphthalene type epoxy resin | 45 | 45 | 45 | 45 | 45 | 45 | 45 | 45 |
| | dicyclopentadiene type epoxy resin | 45 | 45 | 45 | 45 | 45 | 45 | 45 | 45 |
| | epoxy group-containing acrylic resin-a | 10 | 10 | 10 | 10 | 10 | 10 | — | — |
| | epoxy group-containing acrylic rubber-d | — | — | — | — | — | — | 10 | 10 |
| | trialkyltetrahydrophthalic anhydride | 50 | 50 | 50 | 50 | 50 | 50 | 50 | 60 |
| | 1-cyanoethyl-2-phenylimidazole | 4 | 4 | 4 | 4 | 6 | 4 | 4 | 4 |
| | aminosilane coupling agent | 2 | 2 | 2 | 2 | 2 | 2 | 2 | 2 |
| | surface-hydrophobilized fumed silica (average particle diameter 10 nm; maximum 12 nm) | — | — | 4 | 4 | 4 | 4 | — | — |
| | Hydroxyl group-containing core-shell type acrylic rubber particles | — | — | 5 | 5 | 5 | 5 | — | — |
| | Ag particles (average particle diameter 7 μm) | 20 | — | — | — | — | — | 20 | 20 |
| | Ni particles (average particle diameter 7 μm) | — | 20 | 20 | — | — | — | — | — |
| | resin core-Au plated particles (average particle diameter 3 μm) | — | — | — | 20 | — | — | — | — |
| | insulating coating-coated resin core-Au plated particles (average particle diameter 2 μm) | — | — | — | — | 30 | — | — | — |
| | resin core-Au plated particles (average particle diameter 100 μm) | — | — | — | — | — | installation type | — | — |
| Evaluation | dyed phase separation structure by TEM (only resin layer) | compatible | compatible | — | — | — | — | phase separation | phase separation |
| | peak temperature of tan δ for viscoelasticity (° C.) | 178 | 180 | 178 | 178 | 182 | 178 | −20.175 | −20.175 |
| | pH of extracted water | 7 | 7.1 | 7.2 | 7.1 | 7.9 | 7.2 | 6.5 | 4.5 |
| | extracted chloride ion impurity (ppm) | 5 | 4 | 3 | 4 | 5 | 3 | 14 | 130 |
| | ion conductivity (μS/cm) | 40 | 30 | 35 | 32 | 42 | 35 | 70 | 75 |
| | dielectric constant $\epsilon'$ | 3.1 | 3.1 | 3.1 | 3.1 | 3.1 | 3.1 | 3.1 | 3.1 |
| | dielectric loss tangent tan δ | 0.015 | 0.015 | 0.015 | 0.015 | 0.016 | 0.015 | 0.015 | 0.015 |
| | conductive connection stability in PCT (h) (resistance value alteration within 10%) | 300 | 300 | >400 | >400 | >400 | >400 | 200 | 200 |
| | conductive connection stability in TCT (cycle) (resistance value alteration within 10%) | 800 | 900 | >1000 | >1000 | >1000 | >1000 | >1000 | >1000 |
| | soldering heat resistance (times) (resistance value alteration within 10%) | 5 | 5 | 5 | 5 | 5 | 5 | 3 | 3 |

From the results shown in Table 5, it was found that joining reliability as high as that of joining using the adhesive epoxy resin sheets produced in Examples 7 to 12 containing no conductive fine particles was obtained by bonding using the conductive connection sheets produced in Examples 23 to 27 (fine particle un-exposed type and fine particle exposed type).

INDUSTRIAL APPLICABILITY

Since the curable resin compositions of the invention are excellent in mechanical strength, heat resistance, moisture resistance, flexibility, resistance to thermal cycles, resistance to solder reflow, dimensional stability, and the like after curing and provides high adhesion reliability and conduction reliability in the case of use as a conductive material, they are preferably useful for various industrial uses for such as adhesive epoxy resin pastes, adhesive epoxy resin sheets, conductive connection pastes, and conductive connection sheets.

Since the adhesive epoxy resin pastes and the adhesive epoxy resin sheets of the invention are produced using the curable resin compositions of the invention, they are excellent in mechanical strength, heat resistance, moisture resistance, flexibility, resistance to thermal cycles, resistance to solder reflow, dimensional stability, and the like after curing and provides high adhesion reliability and are preferably useful for joining various kinds of electronic parts.

Since the conductive connection pastes and conductive connection sheets are produced using the adhesive epoxy resin pastes and the adhesive epoxy resin sheets of the invention, they are excellent in mechanical strength, heat resistance, moisture resistance, flexibility, resistance to thermal cycles, resistance to solder reflow, dimensional stability, and the like after curing and provides high adhesion reliability and conduction reliability in the case of use as a conductive material and are preferably useful for conductive joining of various kinds of electronic parts.

Since the interlayer adhesives, the non-conductive pastes, the underfills, the non-conducive films, and the die attach films of the invention are produced using the adhesive epoxy resin pastes and the adhesive epoxy resin sheets of the invention, they are excellent in mechanical strength, heat resistance, moisture resistance, flexibility, resistance to thermal cycles, resistance to solder reflow, dimensional stability, and the like after curing and provides high adhesion reliability and are preferably useful for joining of various kinds of electronic parts.

Since the anisotropic conductive pastes, the anisotropic conductive films, and the flip chip tapes of the invention are produced using conductive connection pastes and conductive connection sheets of the invention, they are excellent in mechanical strength, heat resistance, moisture resistance, flexibility, resistance to thermal cycles, resistance to solder reflow, dimensional stability, and the like after curing and provides high adhesion reliability and conduction reliability and are preferably useful for conductive joining of various kinds of electronic parts.

Since the electronic component joined bodies of the invention are produced using the curable resin compositions, adhesive epoxy resin pastes, adhesive epoxy resin sheets, conductive connection pastes, conductive connection sheets, non-conductive pastes, underfills, non-conductive films, die attach films, anisotropic conductive pastes, anisotropic conductive films, or flip chip tapes, they have high adhesion reliability and high conduction reliability.

The invention claimed is:

1. A curable resin composition, which contains an epoxy resin, an epoxy group containing acrylic resin having a weight average molecular weight of 10,000 or higher and a curing agent for an epoxy resin, no phase separation structure being observed in a matrix of a resin when a cured product is dyed with a heavy metal and observed with a transmission electron microscope,
wherein the epoxy group containing acrylic resin having a weight average molecular weight of 10,000 or higher has an epoxy equivalent of 200 to 1000.

2. The curable resin composition according to claim 1, wherein the cured product has a single tan δ peak in viscoelasticity spectrometry and the temperature of the peak is 120° C. or higher.

3. The curable resin composition according to claim 1, wherein the cured product has a swelling ratio of 50% or less measured in a dimethyl sulfoxide solution heated at 120° C.

4. The curable resin composition according to claim 1, wherein extracted water obtained by extracting an eluting component of the cured product with hot water at 110° C. has pH not lower than 5.0 and lower than 8.5.

5. The curable resin composition according to claim 1, wherein extracted water obtained by extracting an eluting component of the cured product with hot water at 110° C. has an electric conductivity of 100 µS/cm or lower.

6. The curable resin composition according to claim 1, wherein the cured product has a dielectric constant of 3.5 or lower and a dielectric loss tangent of 0.02 or lower.

7. The curable resin composition according to claim 1, wherein the epoxy resin is an epoxy resin having a polycyclic hydrocarbon skeleton in the main and no inorganic filler is contained.

8. The curable resin composition according to claim 7, wherein the epoxy resin having a polycyclic hydrocarbon skeleton in the main chain is an epoxy resin having a dicyclopentadiene skeleton or an epoxy resin having a naphthalene skeleton.

9. The curable resin composition according to claim 1, wherein the epoxy group containing acrylic resin having a weight average molecular weight of 10,000 or higher is produced by suspension polymerization method.

10. The curable resin composition according to claim 1, which further contains a low elastic modulus substance having elastic modulus (G') in a range of $1\times10^5$ to $1\times10^8$ Pa at 20° C.

11. An adhesive epoxy resin paste, which comprises the curable resin composition according to claim 1.

12. An interlayer adhesive, which comprises the adhesive epoxy resin paste according to claim 11.

13. A non-conductive paste, which comprises the adhesive epoxy resin paste according to claim 11.

14. An underfill, which comprises the adhesive epoxy resin paste according to claim 11.

15. A conductive connection paste, wherein conductive fine particles are contained in the adhesive epoxy resin paste according to claim 11.

16. An anisotropic conductive paste, which comprises the conductive connection paste according to claim 15.

17. An adhesive epoxy resin sheet, which is obtained by forming the curable resin composition according to claim 1, in a sheet form.

18. The adhesive epoxy resin sheet according to claim 17, wherein a heat-cured product obtained by heat curing at a temperature rising rate of 45° C./min has a storage modulus (G') exceeding $1\times10^3$ Pa.

19. The adhesive epoxy resin sheet according to claim 17, wherein the peak temperature of tan δ based on dynamic viscoelasticity is in a range of −20° C. to 40° C. before curing and 120° C. or higher after curing.

20. A non-conductive film, which comprises the adhesive epoxy resin sheet according to claim 17.

21. A die attach film, which comprises the adhesive epoxy resin sheet according to claim 17.

22. A conductive connection sheet, which comprises the adhesive epoxy resin sheet according to claim 17, and conductive fine particles, at least a part of the conductive fine particles being exposed out of the adhesive epoxy resin sheet.

23. A flip chip tape, which comprises a conductive connection sheet according to claim 22.

24. A conductive connection sheet, which is obtained by embedding conductive fine particles smaller than the thickness of the adhesive epoxy resin sheet in the adhesive epoxy resin sheet according to claim 17.

25. An anisotropic conductive film, which comprises the conductive connection sheet according to claim 24.

26. An electronic component joined body, which is obtained by joining a bump-shaped projected electrode of an electronic part to another electrode in electrically connected state by a curable resin composition according to claim 1.

27. An electronic component joined body, which is obtained by joining at least one circuit substrate selected from the group consisting of a metal lead frame, a ceramic substrate, a resin substrate, a silicon substrate, a compound semiconductor substrate, and a glass substrate by any of the curable resin composition according to claim 1.

28. The electronic component joined body according to claim 27, wherein the resin substrate is a glass epoxy substrate, a bismaleimidetriazine substrate or a polyimide substrate.

* * * * *